United States Patent
Unnikrishnan et al.

(10) Patent No.: US 7,509,234 B2
(45) Date of Patent: Mar. 24, 2009

(54) ROOT CAUSE DIAGNOSTICS USING TEMPORAL DATA MINING

(75) Inventors: K. P. Unnikrishnan, Birmingham, MI (US); Basel Q. Shadid, St. Catharines (CA); P. S. Sastry, Bangalore (IN); Srivatsan Laxman, Bangalore (IN)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/839,775

(22) Filed: Aug. 16, 2007

(65) Prior Publication Data

US 2009/0049338 A1 Feb. 19, 2009

(51) Int. Cl.
*G06F 11/30* (2006.01)
*G21C 17/00* (2006.01)

(52) U.S. Cl. ........................ 702/183; 702/185

(58) Field of Classification Search .................. 702/58, 702/59, 183, 185; 714/5, 31, 48
See application file for complete search history.

(56) References Cited

U.S. PATENT DOCUMENTS

| 5,819,266 | A | 10/1998 | Agrawal et al. | |
|---|---|---|---|---|
| 6,301,503 | B1* | 10/2001 | Hsu et al. | 607/30 |
| 2005/0107840 | A1* | 5/2005 | Conley et al. | 607/32 |
| 2006/0195444 | A1* | 8/2006 | Sastry et al. | 707/6 |
| 2006/0224186 | A1* | 10/2006 | Ziegler et al. | 607/2 |
| 2007/0112276 | A1* | 5/2007 | Simms, Jr. | 600/515 |

OTHER PUBLICATIONS

R. Agrawal and R. Krikant, "Mining sequential patterns," in Proc 11th Intl Conf on Data Eng., (Taipei, Taiwan), IEEE Computer Society, Washington, DC, USA, Mara. 1995.
J. Alon et al., "Discovering Clusters in motion time series data," in-Proc, 2003 IEEE Computer Society Conf. on CVPR, (Madison, Wisconsin), pp. I-375-I-381, Jun. 18-20, 2003.
G. Casas-Garriga, "Discovering unbounded episodes in sequential data," in Proceedings of the 7th European Conference on Principles and practice of Knowledge Discovery in Databases (PKDD'03), (Cavtat-Dubvronik, Croatia), pp. 83-94, 2003.
R. Gwadera, et al., "Reliable detection of episodes in event sequences", in Proc. 3rd IEEE Intl Conf. On Data Mining (ICDM 2003), pp. 67-74, Nov. 19-23, 2003.
M. L. Hetland et al., "Temporal rule discovery using genetic programming and specialized hardware", In Proc. of the 4th Intl. Conf. on Recent Adv in Soft Comp. (RASC), 2002.
M. Hirao, et al., "A practical algorithm to find the best episode patterns," Lecture Notes in Computer Science, vol. 2226, pp. 435-441, 2001.

(Continued)

*Primary Examiner*—Michael P Nghiem

(57) ABSTRACT

A method, system, and computer program product for fault data correlation in a diagnostic system are provided. The method includes receiving the fault data including a plurality of faults collected over a period of time, and identifying a plurality of episodes within the fault data, where each episode includes a sequence of the faults. The method further includes calculating a frequency of the episodes within the fault data, calculating a correlation confidence of the faults relative to the episodes as a function of the frequency of the episodes, and outputting a report of the faults with the correlation confidence.

17 Claims, 12 Drawing Sheets

OTHER PUBLICATIONS

C. Larizza, et al., "Temporal abstractions for Diabetic patient management", in Lecture Notes in Computer Science, 6th Conference on Artificial Intelligence in Medicine in Europe (E. Keravnou et al., eds.) vol. 1211, pp. 319-330, Springer-Verlag, London, UK, 1997.

M. Last et al., "Knowledge discovery in time series databases," IEEE Transactions on Systems, Man and Cybernetics, Part B, vol. 31, pp. 160-169, Feb. 2001.

J. Lin, E. Keogh et al., "Finding motifs in time series," in Temporal Data Mining Workshop Notes (K.P.Unnikrishnan et al., eds.) (SIGKKD, Edmonton, Alberta, Canada), 2002.

J. S. Liu et al., "Markovian structures in biological sequence alignments," Journal of American Statistics Association, vol. 94, No. 1-15, 1999.

H. Mannila et al., "Discovery of frequent episodes in event sequences", Data Mining and Knowledge Discovery, vol. 1, No. 3, pp. 259-289, 1997.

Z. Tronicek, "episode matching," in Combinatorial Pattern Matching, pp. 143-146. 2001.

K. P. Unnikrishnan and R. Uthurusamy, eds., Temporal Data Mining Workshop Notes. SIGKKD, Edmonton, Alberta, Canada, Jul. 23, 2002.

M. Garofalakis et al., "Mining sequential patterns with regular expression constraints," IEEE trans. on Knowledge and Data Eng., vol. 14, pp. 530-552, May 2002.

C. Bettini, X. S. Wang, S. Jajodia, and J. L. Lin, "Discovering Frequent event patterns with multiple granularities in time sequences," IEEE transactions on Knowledge and Data Engineering, vol. 10, pp. 222-237, Mar. 1998.

D. Chudova and P. Smyth, "Pattern discovery in sequences under a Markovian assumption," in Conference on Knowledge Discovery in Data, proceedings of the Eighth ACM SIGKDD International conference on Knowledge Discovery and Data Mining, (Edmonton, Alberta, Canada), Jul. 2002.

D. L. Wang and B. Yuwono, "Anticipation-based temporal pattern generation," IEEE Transactions on Systems, Man and Cybernetics, vol. 25, No. 4, pp. 615-628, 1995.

* cited by examiner

300

Top 15 Fault Correlations Report

Fault-A followed by Fault-B occurred (Frequency of A->B) no of times.
Confidence-A is the confidence that A causes B. Calculated as (100 x Frequen
Confidence-B is the confidence that B is caused by A. Calculated as (100 x Fr

| Frequency of A->B | Fault A | Fault-A Description | Confidence A |
|---|---|---|---|
| 14 | OP281-151 14 | Robot Fault: Gripper Shotpins Failed to Extend On Part Pick-Up DI-69 OR DI-70 Didn't Come On Press Master Start/Reset to Clear Fault 14 | 93 |
| 6 | OP281-151 13 | Robot Fault: Gripper Failed To Close On Part. DI-66 Or DI-68 Didn't Come On Press Master Start/Reset to Clear Fault 13 | 67 |
| 5 | OP350-600 3 | Zone System Fault. E-Stop Relay 1307CR is Not On, I 105. See Zone PC. | 100 |
| 3 | OP350-600 3 | Zone System Fault. E-Stop Relay 1307CR is Not On, I 105. See Zone PC. | 60 |
| 3 | OP755-600 45 | Station System Fault. Faulted Handshake EFT. Toggle Bit From EFT Was Not Set. Check I 190. Measurement Device Not Ready. | 38 |
| 7 | OP281-151 32 | Robot Fault: Cannot Recover From This Position. Using Teach Pendant Manually Drop Off Part Or Dunnage. Electrician Required. 32 | 27 |

302    304    306    308

MATCH TO FIG. 3B

*Fig. 3A*

| EVENT 1 | EVENT 2 | EVENT 3 | EVENT 4 | EVENT 4" | — 1502 |
|---|---|---|---|---|---|
| INTERVAL SET 1 | INTERVAL SET 2 | INTERVAL SET 3 | INTERVAL SET 4 | INTERVAL SET 4" | |

| EVENT 1 | EVENT 2 | EVENT 3 | EVENT 4" | EVENT 4' | — 1504 |
|---|---|---|---|---|---|
| INTERVAL SET 1 | INTERVAL SET 2 | INTERVAL SET 3 | INTERVAL SET 4" | INTERVAL SET 4' | |

US 7,509,234 B2

ROOT CAUSE DIAGNOSTICS USING TEMPORAL DATA MINING

BACKGROUND OF THE INVENTION

The present disclosure relates to root cause diagnostics. More particularly, it relates to performing root cause diagnostics of machine and/or system faults using temporal data mining for fault data correlation.

In a manufacturing or other machine-based environment, faults often occur during normal operation of the machines. In order to maximize productivity and lower costs, it is important to quickly and accurately remedy faults, and return to a normal operating state. As faults occur over a period of time, the sequence of events surrounding each fault can be monitored and recorded in data series, including preconditions that lead to a fault, and post conditions that follow the fault.

In many event sequences, individual time-ordered events in the data series are associated with time durations. In many instances, the time durations may carry useful information. For example, in line status logs of manufacturing plants, the durations of various events carry important information. Looking to immediate preconditions before a fault occurs can be helpful to diagnose the cause of the fault, but may not accurately determine the root cause of the fault, as some faults are the result of a series of events. It would be beneficial to develop a process to extract useful information from temporal data in a manufacturing or machine-based environment to assist in fault diagnostics and root cause analysis for a series of faults or events. Accordingly, there is a need in the art for root cause diagnostics of machine and system faults using temporal data mining for fault data correlation.

BRIEF DESCRIPTION OF THE INVENTION

An embodiment of the invention includes a method for fault data correlation in a diagnostic system. The method includes receiving the fault data including a plurality of faults collected over a period of time, and identifying a plurality of episodes within the fault data, where each episode includes a sequence of the faults. The method further includes calculating a frequency of the episodes within the fault data, calculating a correlation confidence of the faults relative to the episodes as a function of the frequency of the episodes, and outputting a report of the faults with the correlation confidence.

A further embodiment of the invention includes a system for fault data correlation in a diagnostic system. The system includes a host system and a data storage device, holding fault data, in communication with the host system. A temporal data mining (TDM) diagnostics tool executes on the host system. The TDM diagnostics tool includes computer instructions for receiving the fault data including a plurality of faults collected over a period of time, and identifying a plurality of episodes within the fault data, where each episode includes a sequence of the faults. The TDM diagnostics tool further includes computer instructions for calculating a frequency of the episodes within the fault data, calculating a correlation confidence of the faults relative to the episodes as a function of the frequency of the episodes, and outputting a report of the faults with the correlation confidence.

Another embodiment of the invention includes a computer program product for fault data correlation in a diagnostic system. The computer program product includes a storage medium readable by a processing circuit and storing instructions for execution by the processing circuit for implementing a method. The method includes receiving the fault data including a plurality of faults collected over a period of time, and identifying a plurality of episodes within the fault data, where each episode includes a sequence of the faults. The method further includes calculating a frequency of the episodes within the fault data, calculating a correlation confidence of the faults relative to the episodes as a function of the frequency of the episodes, and outputting a report of the faults with the correlation confidence.

Other methods, systems, and/or computer program products according to embodiments will be or become apparent to one with skill in the art upon review of the following drawings and detailed description. It is intended that all such additional methods, computer program products, and/or systems be included within the description, be within the scope of the present invention, and be protected by the accompanying claims.

BRIEF DESCRIPTION OF DRAWINGS

Referring to the exemplary drawings wherein like elements are numbered alike in the accompanying figures.

DETAILED DESCRIPTION OF THE INVENTION

Exemplary embodiments, as shown and described by the various figures and the accompanying text, provide systems, methods, and computer program products for performing root cause diagnostics of machine and/or system faults using temporal data mining for fault data correlation. A manufacturing process, or other machine-based process, can be divided into a sequence of controlled events involving multiple machines. Each event has duration, from a start time to an end time, as well as preconditions and post conditions. A sequence of events can vary in length and complexity from one machine to another within a given process. Machines in manufacturing systems may enter a faulted state if one of the events in the sequence exceeds its maximum allowed duration or one of the event's preconditions changes after the start of the event, etc. Thus, machine faults can be viewed as a type of temporal data. In exemplary embodiments, temporal data mining is applied to find hidden sequences, such as episodes of faults, which are noteworthy in identifying likely root causes of machine faults.

Figure 1:
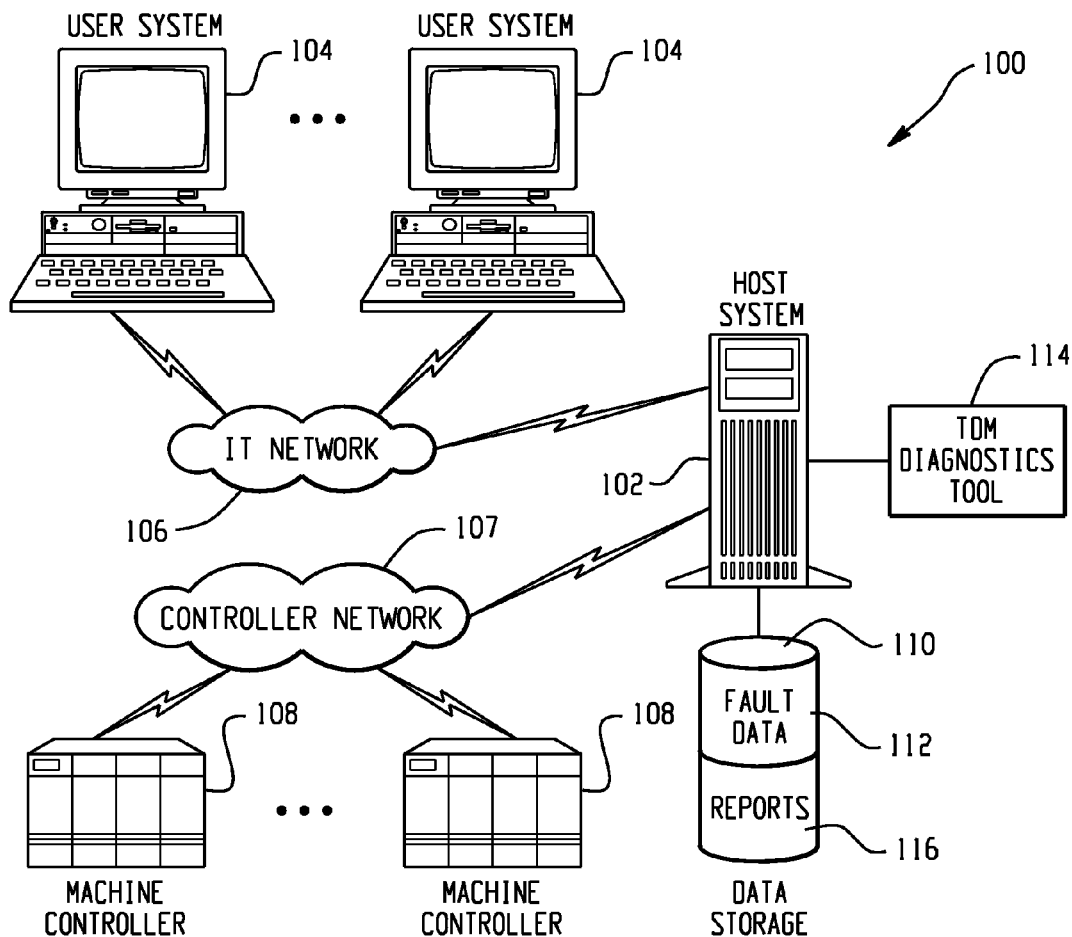
FIG. 1 depicts a system for performing root cause diagnostics of machine and system faults using temporal data mining.

Turning now to the drawings, it will be seen that in FIG. 1 there is a block diagram of a system 100 upon which performing root cause diagnostics of machine and/or system faults using temporal data mining for fault data correlation is implemented in exemplary embodiments. The system 100 of FIG. 1 includes a host system 102 in communication with user systems 104 over an information technology (IT) network 106. Multiple machine controllers 108 are interfaced to a controller network 107, which may be accessible by the host system 102. In exemplary embodiments, the host system 102 is a high-speed processing device (e.g., a mainframe computer) including at least one processing circuit (e.g., a CPU) capable of reading and executing instructions, and handling large volumes of processing requests from user systems 104. The host system 102 may function as an application server, a database management server, and/or a web server. User systems 104 may comprise desktop or general-purpose computer devices that generate data and processing requests. While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The IT network 106 and the controller network 107 may be any type of communications networks known in the art. For example, the IT network 106 and/or the controller network 107 may be intranets, extranets, or internetworks, such as the Internet, or a combination thereof. The IT network 106 and/or the controller network 107 can be wireless and/or wired networks. Although the IT network 106 and the controller network 107 are depicted as separate networks, it will be understood that the networks can be combined or further subdivided within the scope of the invention.

The machine controllers 108 may be any type of programmable logic controller (PLC), programmable controller (PC), computer numerical control (CNC), or any type of embedded controller hardware that hosts software to control a machine and diagnose machine faults. In exemplary embodiments, each machine controller 108 interfaces with sensors and/or other data collection means (not depicted) to report machine faults and other events to the host system 102. While only two machine controllers 108 are depicted in the system 100 of FIG. 1, it will be understood that any number of machine controllers 108 may be implemented within the scope of the invention. For example, one of the machine controllers 108 may represent a controller for a welding robot, while another machine controller 108 may be a controller for an automated conveyor system.

In exemplary embodiments, the host system 102 accesses and stores information to a data storage device 110. The data storage device 110 refers to any type of storage and may comprise a secondary storage element, e.g., hard disk drive, tape, or a storage subsystem that is external to the host system 102. In alternate exemplary embodiments, the data storage device 110 is internal to the host system 102. It will be understood that the data storage device 110 shown in FIG. 1 is provided for purposes of simplification and ease of explanation and is not to be construed as limiting in scope. To the contrary, there may be any number data storage devices 110 accessible by the host system 102. In exemplary embodiments, the data storage device 110 holds fault data 112 that is reported by the machine controllers 108.

In exemplary embodiments, the host system 102 executes various applications, such as a temporal data mining (TDM) diagnostics tool 114. The TDM diagnostics tool 114 processes the fault data 112 and outputs one or more reports 116. The reports 116 can be stored on the data storage device 110 for future access and archival purposes. In exemplary embodiments, the TDM diagnostics tool 114 employs temporal data mining on the fault data 112 as detailed herein and described in U.S. patent application Ser. No. 11/068,498, entitled SYSTEM AND METHOD FOR MINING OF TEMPORAL DATA, filed on Feb. 28, 2005, of common assignment herewith and incorporated by reference herein in its entirety. While the TDM diagnostics tool 114 is depicted as a single application executing upon the host system 102, it will be understood that any module, sub-component, or portion of the TDM diagnostics tool 114 may be executed or stored on any combination of the user systems 104, e.g., a distributed application architecture. Other applications, e.g., business applications, a web server, etc., may also be implemented by the host system 102 as dictated by the needs of the enterprise of the host system 102.

Figure 2:
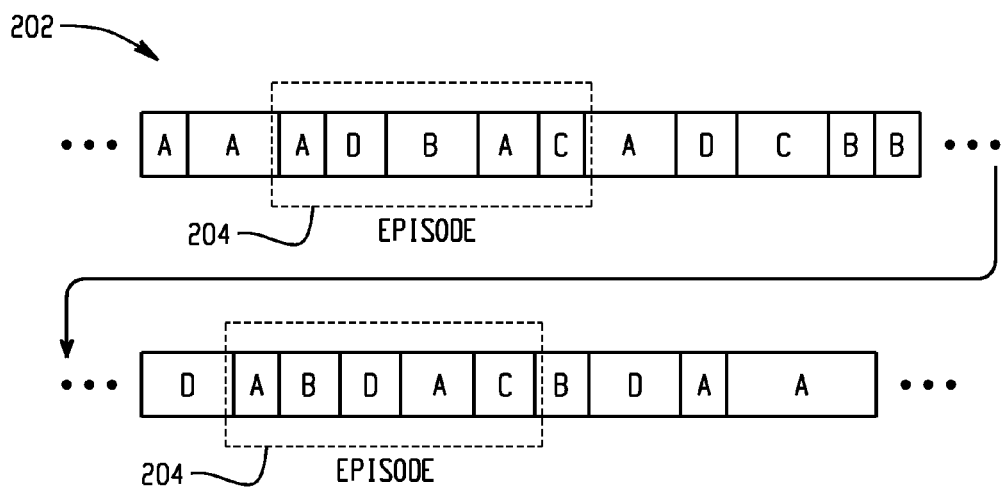
FIG. 2 depicts an exemplary episode identification.

In exemplary embodiments, the TDM diagnostics tool 114 analyzes the sequence and duration of machine faults in the fault data 112 for episodes. An episode is a sequence of faults or other events that appear as a pattern within the data. The faults or events in an episode may be identified by a single machine controller 108 or across multiple machine controllers 108 in a sequence. For example, as depicted in FIG. 2, the TDM diagnostics tool 114 can identify patterns of temporal data as episodes. The sequence 202 of FIG. 2 represents a time sequence of data captured within the fault data 112, e.g., temporal data. The sequence 202 includes a number of faults, designated as faults A, B, C, and D. Each fault A-D may represent a different fault reported by the same machine controller 108 or different machine controllers 108. While traditional diagnostic approaches typically perform single variable fault analysis, through exemplary embodiments of the present invention, a sequence of faults with multiple variables can be identified as an episode, enabling the true root cause of a fault to be determined. From the sequence 202, the TDM diagnostics tool 114 may discover that an episode 204 frequently occurs (e.g., fault A followed by fault B followed by fault A followed by fault C). By further analysis, the TDM diagnostics tool 114 may reveal that fault A is the root-cause which leads to fault B, another occurrence of fault A, and then finally to fault C. The TDM diagnostics tool 114 is capable of finding the episode 204 in the presence of noise, illustrated as the random presence of a fault D in the episode 204. In other words, even though the fault D appears in different locations within the episode 204, the TDM diagnostics tool 114 can determine that the fault D is not actually a component of the episode 204.

The TDM diagnostics tool 114 may also support, categorizing, sorting and filtering of episodes to remove episode types that are known or expected from further analysis. For example, in a typical manufacturing system, machine faults can be classified as well-known episodes, expected episodes, and unexpected episodes. Well-known episodes include fault states that the system 100 or machine controllers 108 are designed to enter in response to a known event. For example, an emergency stop event may trigger machines controllers 108 to place their associated machines in an emergency stop faulted state. Expected episodes include faults within the same component of a machine, and the subsequent faults happen as a result of an incomplete or inappropriate recovery process of the root cause fault. Unexpected episodes include faults that are reported by machine controllers 108 for multiple machines or in different components of the same machine, where correlation between the events or faults may not otherwise be known. As users analyze the reports 116 generated by the TDM diagnostics tool 114, the TDM diagnostics tool 114 can be reconfigured to block reporting of well-known and expected episodes such that only unexpected episodes are reported. Thus, a user's attention can be focused on troubleshooting unexpected episodes and identifying the root cause thereof.

In exemplary embodiments, the TDM diagnostics tool 114 correlates faults and calculates a confidence value of the correlations. For example, the TDM diagnostics tool 114 may analyze the fault data 112 and determine the number of times within a sequence, such as the sequence 202 of FIG. 2, that fault A follows fault B (frequency of A->B). The confidence that fault A causes fault B may be calculated as 100*frequency of A->B/frequency of A. Similarly the confidence that fault B is caused by fault A may be calculated as 100*frequency of A->B/frequency of B. Looking at the confidence calculation in both directions may aid in determining if additional faults contribute to the sequence. For example, fault A may occur before fault B 93% of the time, but 54% of the time fault B may occur without being preceded by fault A, indicating that fault A by itself is not the root cause of fault B. Through extending the analysis to relationships between faults, an episode of multiple faults can be revealed that highlights the true root cause of a given failure.

Figure 3B:
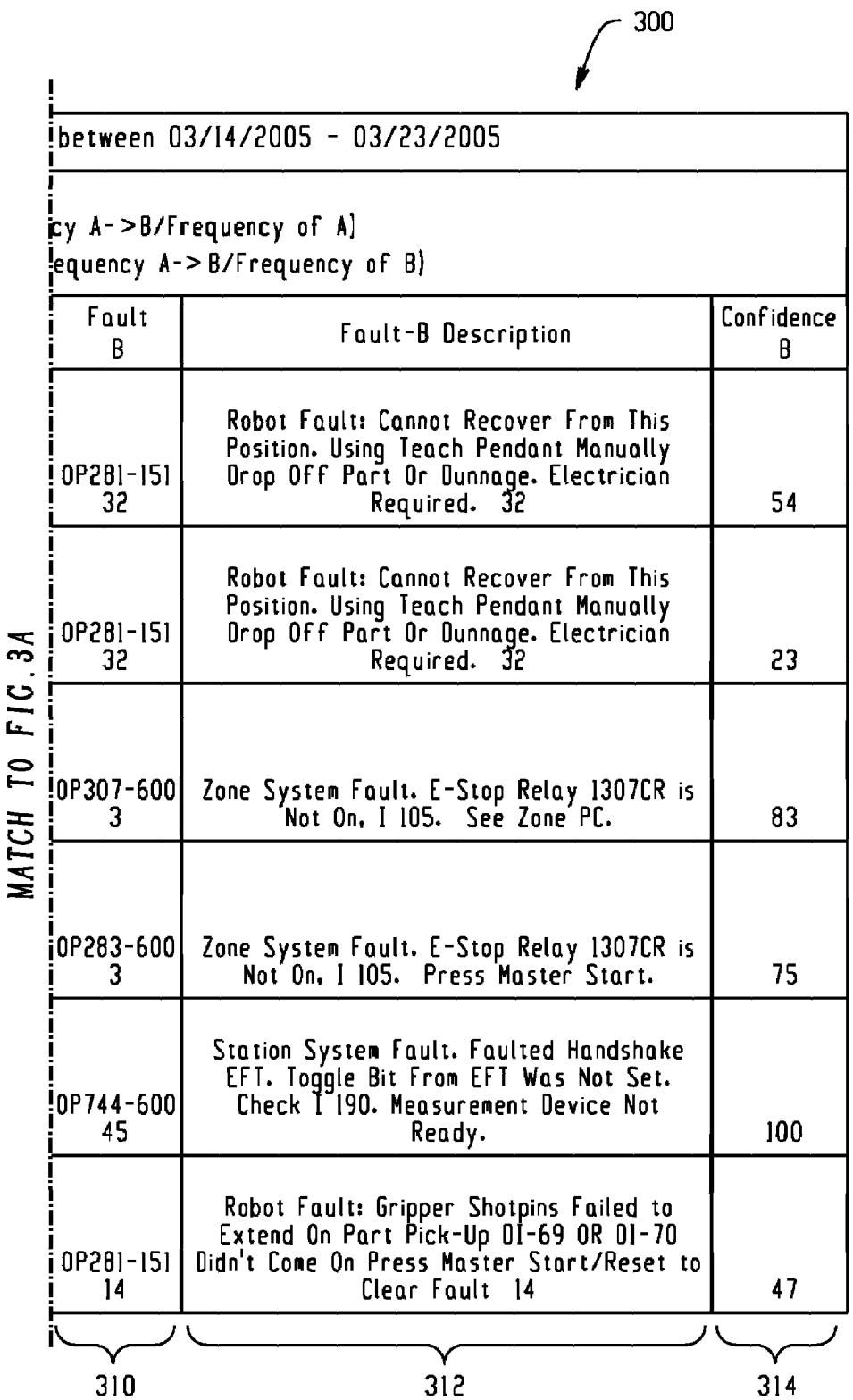
FIG. 3 depicts an exemplary report of fault correlations.

The TDM diagnostics tool 114 may generate multiple reports 116 to assist in diagnosing the root cause of faults collected in the fault data 112. An exemplary report 300 is depicted in FIG. 3 illustrating the top 15 fault correlations for a selected date range. It will be understood that the report 300 merely depicts one example of the type of reports 116 that may be generated by the TDM diagnostics tool 114 of FIG. 1. The report 300 provides a summary of the most frequent faults collected in the fault data 112 of FIG. 1 for a selected period of time, along with the relationships identified between fault pairs. In exemplary embodiments, the report 300 includes a frequency of A->B column 302, a fault-A column 304, a fault-A description column 306, a confidence-A column 308, a fault-B column 310, a fault-B description column 312, a confidence-B column 314. The frequency of A->B column 302 indicates the number of times within the examined data that the sequence of fault A followed by fault B occurred for each row in the report 300, where the specific faults referred to as fault A and fault B are identified in each row of the report 300. For example, in the first row, fault A is "OP281-151-14", located in the fault-A column 304 and further described in the fault-A description column 306, while in the second row, fault A is "OP281-151-13". Similarly, fault B, as listed in the fault-B column 310 and further described in the fault-B description column 312, can vary between rows as different relationships between faults are identified. The first two rows of the report 300 illustrate that two different faults "OP281-151-14" and "OP281-151-13", as identified in the fault-A column 304, both precede the same fault "OP281-151-32", as identified in the fault-B column 310, with a frequency as defined in frequency of A->B column 302. The confidence-A column 308 and the confidence-B column 314 provide a calculated confidence value for each correlation as previously described. The report 300 may be expanded to include longer correlation chains as episodes. Additional features may include cell highlighting within the report 300 to illustrate correlations between other reports 116 of FIG. 1, such as a single variable analysis report. Highlighting or linking may enable a user to identify high frequency individual faults in relation to other less frequent but related faults that do not otherwise appear in a single variable analysis report. For example, the fault "OP281-151-32" may appear frequently, but the separate preceding faults "OP281-151-14" and "OP281-151-13" may be too individually infrequent to alert a user to an issue when only single variable analysis is performed.

Figure 4:
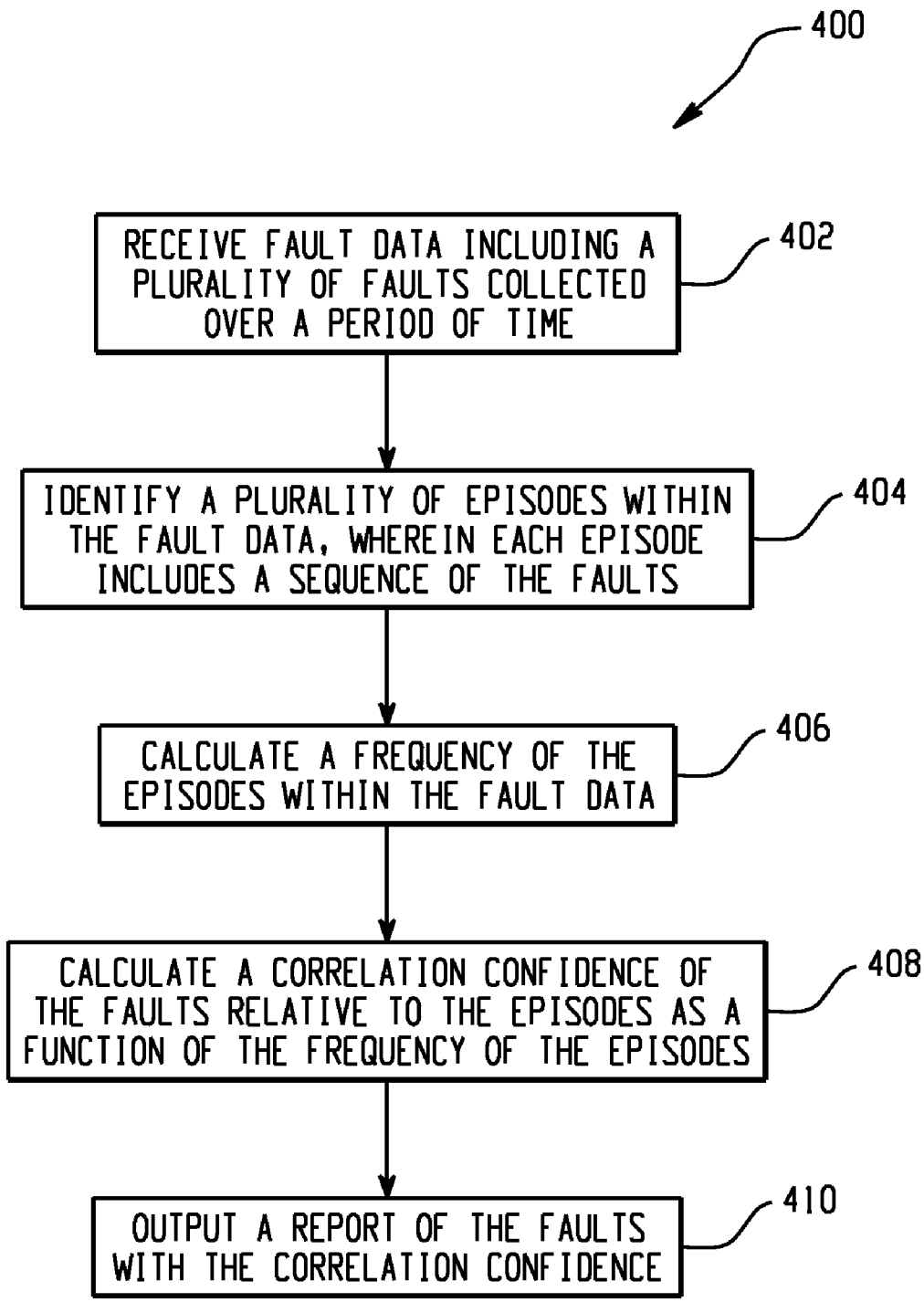
FIG. 4 depicts a method for performing root cause diagnostics of machine and system faults using temporal data mining for fault data correlation.

Turning now to FIG. 4, a process 400 for fault data correlation in a diagnostic system is depicted in accordance with exemplary embodiments and in reference to the system 100 of FIG. 1. At step 402, the TDM diagnostics tool 114 receives the fault data 112, including a plurality of faults collected over a period of time. While the period of time over which the fault data 112 is collected can vary (e.g., weeks or months), a particular period analyzed by the TDM diagnostics tool 114 can be a user selectable period (e.g., one week of data). Other software (not depicted) may preprocess or otherwise filter the fault data 112 prior to receipt by the TDM diagnostics tool 114. In exemplary embodiments, the fault data 112 includes a temporal data series comprising events with start times and end times, a set of allowed dwelling times, and a threshold frequency.

At step 404, the TDM diagnostics tool 114 identifies a plurality of episodes within the fault data 112, where each episode includes a sequence of the faults. The process of identifying episodes is described in greater detail further herein. The TDM diagnostics tool 114 may also identify an initial fault in the sequence of faults in one of the episodes as a root cause, and report the root cause. Furthermore, the TDM diagnostics tool 114 may calculate a downtime as time duration between an initial fault and a final fault in the sequence of faults in one of the episodes, and report the downtime.

At step 406, the TDM diagnostics tool 114 calculates a frequency of the episodes within the fault data 112. The frequency of the episodes may be a count of a number of episode instances within the fault data 112. The TDM diagnostics tool 114 may additionally categorize each of the episodes as an episode type, where the episode type is one of a well-known episode, an expected episode, and an unexpected episode. Sorting or filtering based on the episode type may be performed to further enhance reporting options.

At step 408, the TDM diagnostics tool 114 calculates a correlation confidence of the faults relative to the episodes as a function of the frequency of the episodes. The correlation confidence may be calculated as a confidence that a first fault caused a second fault. Alternatively or additionally, the correlation confidence may be calculated as a confidence that the second fault was caused by the first fault.

At step 410, the TDM diagnostics tool 114 outputs a report of the faults with the correlation confidence, such as the report 300 of FIG. 3. The TDM diagnostics tool 114 may output a number of reports that include information related to the identified root cause of a fault, a downtime, and/or data filtered on one or more episode type (e.g., well-known, expected, and/or unexpected). Additional reports may include or highlight single variable fault frequency to illustrate the most common individual faults.

The process used by the TDM diagnostics tool 114 of FIG. 1 to detect frequent or repetitive patterns in the form of sequential episodes in time stamped data series from the fault data 112 to produce the reports 116 is further described herein. An aspect of this technology is the defining of appropriate frequency counts for non-overlapping and non-interleaved episodes. Two frequency measures and embodiments for obtaining frequent episodes are described. The embodiments described herein search through the temporal data series from the fault data 112 to detect non-overlapping and non-interleaved episodes which are frequent (according to these measures) in the temporal data series. The method includes checking whether a frequent episode is principal in the data series.

Figure 5:
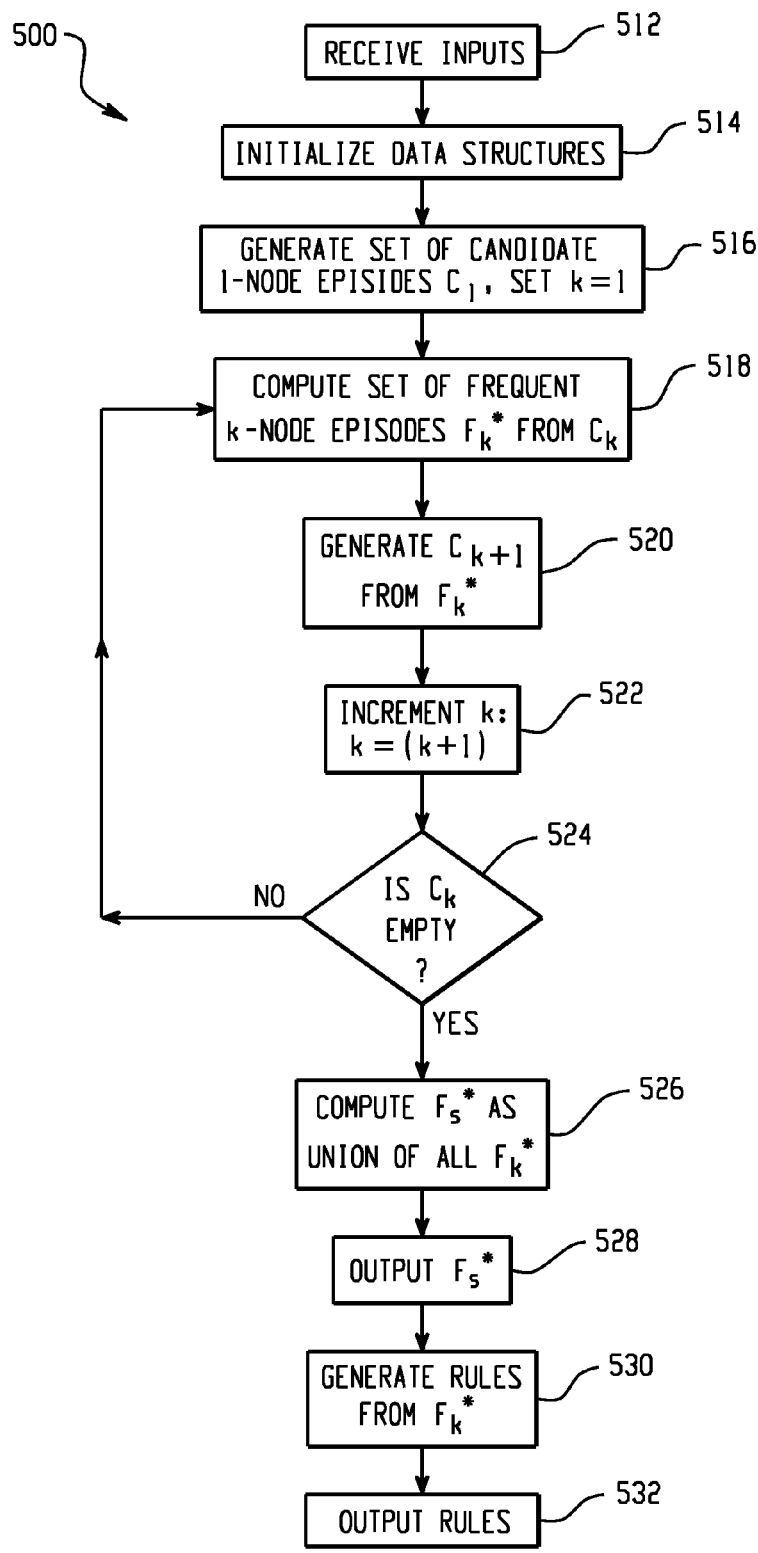
FIG. 5 depicts a method for temporal data mining of a temporal data series with events having durations.

FIG. 5 is a flowchart showing a method for temporal data mining. While the steps are in a particular order and show a particular manner to achieve results, the technology described herein can be implemented in other ways too. The method includes a step 512 for receiving as input a temporal data series including events (e.g., faults) with start times and end times, a set of allowed dwelling times, and a threshold frequency. A set E of event types, an expiry time, and a confidence threshold may also be received as input in step 512. In a step 514, data structures for implementing the method are initialized. In a step 516, all frequent principal episodes of a particular length in the temporal data series having dwelling times within the allowed dwelling times are found. Principal episodes are defined and discussed below. In step 516 also, the particular length is shown as one (1) in FIG. 5, but other values of length may be used.

Successive passes are made through the temporal data series to iteratively find all frequent principal episodes. This is shown at steps 518 to 524. In step 518, in the first iteration, all frequent principal episodes of length 1 are computed; in an iteration, in general, all frequent principal episodes of the particular length are computed at step 518. This is typically done by identifying one or more occurrences of a candidate episode in the temporal data series, incrementing a count for each identified occurrence, and determining frequent episodes from the counts of occurrence in comparison to the threshold frequency. A test for whether a frequent episode is principal is made, and if the episode passes the test it is included in successive steps. Next, at step 520, frequent principal episodes of the particular length are combined in specific ways to produce combined episodes of an increased length. Typically, the increased length may be one more than the particular length. The combined episodes are tested, and those having appropriate subepisodes which are not frequent principal episodes are removed, to leave a set of candidate episodes for the next iteration. The iteration index is incremented at step 522, and may match the value of the increased length. The particular length may be reset to the increased length for the next iterative pass through the temporal data series. If no new candidate episodes are left after removing combined episodes having subepisodes which are not frequent principal episodes, iteration terminates at a step 524. The method continues at step 526 to compute the collection of all frequent principal episodes (i.e. frequent principal episodes of all lengths) by combining all the sets of frequent principal episodes found in the iteration steps 518 to 524. In a step 528, the set of all frequent principal episodes is provided as output of the method.

Also shown in FIG. 5 are a rule generation step 530 and a step 532 of producing output of the rules. Depending on details of the embodiment under consideration, the method 500 is capable of recognizing non-overlapping occurrences of episodes or non-interleaved occurrences of episodes. This capability is described in detail below in connection with FIGS. 6-11.

To describe mathematical details that are referenced herein, first is a description of some of the terms used.

Temporal data series discussed in this disclosure are made up of triplets $(E_i, t_i, \tau_i)$, in which an event $E_i$ begins at a start time $t_i$ and ends at an end time $\tau_i$, with $\tau_i > t_i$. Both $t_i$ and $\tau_i$ may be integers. Events in the temporal data series are not instantaneous and thus require for their specification both start and end times. Temporal data series discussed in this disclosure are typically ordered so that events are arranged in order of increasing (or at least, nondecreasing) end time value. An example generic temporal data series as described herein may be denoted $<(E_1, t_1, \tau_1), \ldots (E_n, t_n, \tau_n)>$.

The temporal data series may also be denoted an event sequence $(s, T_s, T_e)$ with $T_s$ and $T_e$ fixing the lower and upper extremities of the event sequence. For the sake of notational succinctness this triple is denoted by s. The length n of the temporal data series may be denoted $|s|$. The events $E_i$ may be drawn from a set E of possible event types which may be provided as an input at step 512, as described above.

The dwelling time or time duration of event $E_i$ is the difference $\Delta_i = \tau_i - t_i$. The events in the temporal data series may have varying dwelling times. Often, in event sequences as discussed herein where the events have associated time durations, the time durations of events can carry useful information.

Example events may also be denoted herein by A, B, C, and so on. The associated time/duration value(s) may be suppressed when the order of events is clear from the context, or when the order is not relevant to the discussion. An example event sequence of a temporal data series may be (A, 1, 2), (B, 3, 4), (C, 4, 5), (E, 12, 13), (A, 14, 16), (B, 15, 19), (C, 16, 22).

A particular event type may be of interest for frequent episode discovery when its dwelling time lies within a certain range or time interval, e.g., 1 to 10 minutes, or in a set of time intervals. For example, in manufacturing plant data, downtime events of short duration, say, between 10 and 30 minutes, may be of interest. In another example, downtime events of either very short (between 1 and 10 minutes) or very long duration (between 30 and 180 minutes) may be of interest.

The set of all allowable dwelling times for events may be a design choice made by the user of a temporal data mining method. This set is denoted herein as $B = \{B_1, \ldots, B_K\}$. B is a collection of time intervals. That is, B is a discrete set with a finite number of elements, but each element is a time interval. In the instances discussed above of manufacturing plant data, B may be taken as the set containing the single interval [10-30] in the first episode, $B = \{[10\text{-}30]\}$. In the other example above, B may be taken as $B = \{[1\text{-}10], [30\text{-}180]\}$.

It may be the case that an event in an episode may be of interest for frequent episode discovery only for some, and not all, intervals in B. Thus, an episode includes an associate between a node of the episode and possible durations that are allowed as dwelling times for that node in the episode. An episode therefore includes an ordered set of nodes, each node having an associated event type and an associated set of intervals (in B) that are allowed as durations for that node. The length or size of an episode is the number of nodes in it. For an episode denoted by, e.g., $\alpha$, its length may be denoted by $|\alpha|$.

An ordered sequence of events, e.g., $(A \rightarrow B \rightarrow C)$, may be denoted an episode, but this specification is not complete, in the context of this disclosure, without the association between nodes and allowed dwelling times. This association may be specified by providing a map $d_\alpha$ which associates with each node of the episode $\alpha$ a collection of intervals in B, that is, a subset of B.

For purposes of discussion in this disclosure, the associated subsets of B may also be specified directly in the ordered sequence of events, for short sequences. If, for instance B={ [1-2], [30-100]}, a three node episode may be specified as (A([1-2])→B([1-2], [30-100])→C([1-2])). An episode occurs in the temporal data series if the events of the episode occur in the temporal data series in the same order as in the episode, and have durations allowed by the association between nodes of the episode and intervals in B.

Returning to discussion of the example seven-event sequence above, consider the three-node episode (A([1-2])→B([1-2], [30-100])→C([1-2])). The sequence of event-time value pairs (A, 1, 2), (B, 3, 4), (C, 4, 5) is an occurrence of the episode. The sequence (A, 14, 16), (B, 3, 4), (C, 4, 5) is not an occurrence of the episode, since A occurs later than B and C. Nor is the sequence (A, 1, 2), (B, 3, 4), (C, 16, 22) an occurrence of the episode, since C has a duration longer than allowed for a dwelling time. There is only one occurrence of the episode (A([1-2])→B([1-2], [30-100])→C([1-2])) in the example event sequence.

The specification of B allows the user to direct the search for frequent episodes of the kind that are of interest to the user. Towards this end, it may be preferable to specify event-specific B-sets. The set of all possible time intervals, B, would then be a function of the event type associated with the node under consideration.

For example, if an episode $\alpha$ is defined formally as a set of nodes $V_\alpha = \{v_1, \ldots, v_n\}$ on which is defined a total order $<_\alpha$, the association between each node and an event type may be provided by a map $g_\alpha$ from the set $V_\alpha$ to the set of event types E. Thus an event specific B-set may be denoted as $B_{g\alpha(v)}$. Also, as previously discussed, the allowed dwelling times may be provided by a map $d_\alpha$ from the set $V_\alpha$ to a subset of B.

In the case where event-specific allowable dwelling times are used, then, for each node $v \in V_\alpha$, the set of allowed dwelling times may be regarded as a subset of $B_{g\alpha(v)}$, i.e. $d_\alpha(v) \in 2^{Bg\alpha(v)}$ (where $2^{Bg\alpha(v)}$ is the set of all subsets of $B_{g\alpha(v)}$, the power set of $B_{g\alpha(v)}$). Thus, embodiments of the method described herein would be able to handle such event-specific B-sets. However, for the sake of notational convenience, the set of time intervals is denoted herein simply as B.

Consider the episode $\alpha$ specified as $\alpha=(V_\alpha, <_\alpha, g_\alpha, d_\alpha)$. An episode $\beta$ specified as $\beta=(V_\beta, <_\beta, g_\beta, d_\beta)$, is a subepisode of the episode $\alpha$, and written $\beta \leq \alpha$, if there is a 1-to-1 map from the set of nodes of $\beta$ into the set of nodes of $\alpha$, $f_{\beta\alpha}: V_\beta \to V_\alpha$ with the following three properties: First, for each node v in $\beta$, the associated event is the same as the event associated with the node in $\alpha$ to which v is mapped by $f_{\beta\alpha}$, that is, $g_\alpha(f_{\beta\alpha}(v)) = g_\beta(v)$. Second, for each node v in $\beta$, every allowed dwelling time for the event associated with the node in $\alpha$ to which v is mapped by $f_{\beta\alpha}$ is also an allowed dwelling time for the event associated with the node v, that is, $d_\alpha(f_{\beta\alpha}(v)) \subseteq d_\beta(v)$. Finally, the ordering of nodes is preserved under the mapping between $\alpha$ and $\beta$; that is, for each pair of nodes v and w in $\beta$, with $v <_\beta w$ under the order relation $<_\beta$, the nodes in $\alpha$ to which v and w are mapped have the same ordering under the order relation $<_\alpha$, i.e., $f_{\beta\alpha}(v) <_\alpha f_{\beta\alpha}(w)$.

According to the definition of the subepisode, it does not suffice if just the relative ordering of events in the candidate subepisode matches that of the episode. In addition, the dwelling time constraints on the events of the candidate subepisode are to be consistent with those that the episode itself would allow.

A strict subepisode $\beta$ of an episode $\alpha$ is a subepisode for which equality with $\alpha$ does not hold, i.e. $\beta \leq \alpha$ and $\beta \neq \alpha$. A strict subepisode may be denoted by $\beta \triangleleft \alpha$. When $\beta \leq \alpha$, $\alpha$ may also be denoted a superepisode of $\beta$, and written $\alpha \geq \beta$. Similarly, a strict superepisode may be denoted $\alpha \triangleright \beta$.

An episode $\alpha$ is said to occur in the temporal data series if events of the proper event type occur in the proper order in the temporal data series, with allowed dwelling times, as defined by the set of nodes, ordering, and maps specified by the episode $\alpha=(V_\alpha, <_\alpha, g_\alpha, d_\alpha)$. The occurrence of episode $\alpha$ in the event sequence (s, $T_s$, $T_e$) is written as $\alpha \triangleright s$. An occurrence of an episode in the temporal data series is also an occurrence of each of its subepisodes. That is, if $\beta \leq \alpha$, then $\alpha \triangleright (s, T_s, T_e) \Rightarrow \beta \triangleright (s, T_s, T_e)$.

A measure $\lambda_s(\alpha)$ of how often $\alpha$ occurs in the event sequence s may be defined. This may be any reasonable notation of frequency, in particular, the frequency measures defined below for non-overlapping and non-interleaved occurrences.

One way of defining the frequency of occurrence of an episode in a temporal data series may be by counting the number of occurrences. In the example event sequence (A, 1, 2), (B, 3, 4), (C, 4, 5), (E, 12, 13), (A, 14, 16), (B, 15, 19), (C, 16, 22), the episode (A([1-10])→B([1-10])→C([1-10])), occurring 4 times in the event sequence, results in a frequency 4. Often, the frequency threshold is expressed as a fraction of data length. Thus, if the threshold input is the fraction, th, then, the above episode would become frequent in the given event sequence (which is of length of 7) if 4/7 is greater than th.

A non-overlapping occurrence of an episode is one where no event of the episode occurs between two events of another occurrence of the episode. For example, there are two non-overlapping occurrences of the episode (A([1-10])→B([1-10])→C([1-10])) in the event sequence (A, 1, 2), (B, 3, 4), (C, 4, 5), (E, 12, 13), (A, 14, 16), (B, 15, 19), (C, 16, 22). It suffices to track only the innermost occurrence of (A([1-10])→B([1-10])→C([1-10])) in an event sequence like (A, 1, 2), (B, 2, 3), (A, 3, 4), (B, 4, 6), (A, 7, 9), (B, 8, 10), . . . , and this forestalls arbitrarily large memory and processor time consumption.

A non-interleaved occurrence of an episode may be defined as follows. Each occurrence of an episode is may be considered as a 1-to-1 map, h, from the nodes of the episode to events in the temporal data series. For an episode $\alpha$, the number of nodes in $\alpha$ may be denoted by $|\alpha|$ and the ordered sequence of nodes of $\alpha$ may be referred to as $v_1, v_2, \ldots$. The $j^{th}$ node of the episode $\alpha$ may also be denoted herein as $\alpha.g[j]$.

Let $h_1$ and $h_2$ denote two different occurrences of $\alpha$. Thus, $h_1(v_i)$ denotes the event in the temporal data series that corresponds to the node $v_i$ of the episode $\alpha$ in the occurrence represented by $h_1$. By $h_1(v_i) < h_2(v_j)$ is meant that the event (in the temporal data series) corresponding to node $v_i$ in occurrence $h_1$ has an earlier occurrence time than that of the event corresponding to node $v_j$ in occurrence $h_2$.

Two occurrences, $h_1$ and $h_2$ of an episode $\alpha$ are said to be non-interleaved if either $$h_2(v_j) > h_1(v_{j+1}) \; \forall j, \; 1 \leq j < |\alpha|$$

or $$h_1(v_j) > h_2(v_{j+1}) \; \forall j, \; 1 \leq j < |\alpha|.$$

As an example, the event sequence (A, 1, 3), (B, 2, 4), (D, 4, 5), (A, 5, 6), (C, 7, 10), (B, 11, 13), (C, 15, 18) contains two non-interleaved occurrences of the episode (A([1-2])→B([2])→C([3])) namely, <(A, 1, 3), (B, 2, 4), (C, 7, 10)> and <(A, 5, 6), (B, 11, 13), (C, 15, 18)>. The A event of the second non-interleaved occurrence occurs in the event sequence after the B event of the first non-interleaved occurrence, and the B event of the second non-interleaved occurrence occurs in the event sequence after the C event of the first non-interleaved occurrence.

In the embodiments discussed below, automata are used to identify and recognize occurrences of candidate episodes. In terms of the automata that recognize each occurrence, this definition of non-interleaved means the following. An instance of the automaton for a candidate episode $\alpha$ can transit into the state corresponding to a node, say $v_2$, only if an earlier instance (if any) of the automaton has already transited into state $v_3$ or higher. Non-interleaved occurrences would include some overlapped occurrences though they do not include all occurrences.

The definition introduced above for frequency of occurrences of an episode in a temporal data series can be refined by considering an episode to have occurred only if its occurrence meets the criteria for a non-overlapping occurrence, or meets the criteria for a non-interleaved occurrence. Which of these two different criteria are intended is clear from the context in the discussion below. The definitions of non-overlapping occurrences and non-interleaved occurrences thus provide two frequency measures to apply to episode occurrence in a temporal data series.

The general procedure for discovering frequent episodes is as follows. First all frequent 1-node episodes in the temporal data series are found. Then these are combined in all possible ways to make candidate 2-node episodes. By calculating the frequencies of these candidates, all frequent 2-node episodes are obtained. These are then used to obtain candidate 3-node episodes and so on. The general method provides a reduced number of passes over the data series. The main computationally intensive step in frequent episode discovery is that of calculating the frequency of sets of candidate episodes.

Temporal data mining of frequent episodes described herein can be adapted to detect frequent or repetitive patterns in the form of sequential episodes in time stamped data series. As explained above, an episode or pattern is frequent if its detected occurrences meet or exceed a frequency value specified by a user or from a preprogrammed value.

Two episodes are said to be similar if they are identical except for the fact that one allows some more time intervals (for the event dwelling times) than the other, and if their frequencies of occurrence are equal in the given event sequence. Thus, unlike episodes or subepisodes, similar episodes are always defined with respect to a given event sequence and a given frequency count.

Formally, two episodes $\alpha$ and $\beta$ are said to be similar in the event sequence s (written $\alpha \equiv \beta$ in s) if all of the following conditions are met. First, either $\alpha$ is a subepisode of $\beta$ or $\beta$ is a subepisode of $\alpha$, $\alpha \preceq \beta$ or $\beta \preceq \alpha$. Second, the two episodes have the same length (same number of nodes), $|\alpha|=|\beta|$. Third, $\alpha$ and $\beta$ occur in s with the same frequency, $\lambda_s(\alpha)=\lambda_s(\beta)$.

An episode $\alpha^*$ is said to be principal in an event sequence s if the following two conditions hold: (1) the episode $\alpha^*$ occurs in s, $\alpha^* \triangleright s$, and (2) there is no strict superepisode of it which is similar to it (in the event sequence s), i.e., there is no $\alpha \succ \alpha^*$ such that $\alpha \equiv \alpha^*$ in s.

Given a principal episode, all episodes similar to it can be generated by appending time intervals (that do not contribute to the eventual episode frequency) to the event duration sets of the principal episode.

Subepisodes of principal episodes are in general not principal. Indeed, all the non-principal episodes that are similar to a given principal episode are after all subepisodes of the given principal episode. However, all subepisodes generated by dropping nodes (rather than by appending time intervals to the d(·) sets) of a principal episode are most certainly principal.

Returning now to FIG. 5, the process of computing the set of all frequent principal episodes is incremental and is done through the steps shown in FIG. 5. In step 512, a temporal data series including events with start times and end times is received as input. The temporal data series may be recorded in a database, such as the fault data 112 of FIG. 1, and the entire data series read into memory at the outset at step 512. That is to say, the processing of the temporal data series may occur offline, and not in real time. In this way, events under consideration may be examined later after identification by the method described here.

Also in step 512, a set B of allowed dwelling times, and a threshold frequency $\lambda$ are received as inputs. An expiry time $t_x$ and a confidence threshold $\rho_{min}$ may also be received as inputs. A set E of event types may be provided as well in the input at step 512.

Data structures of use in implementing the method may be initialized in a step 514. These data structures may include, but are not limited to, arrays, lists, flags, etc. as appropriate. In particular a variable $F_s^*$ to hold frequent principal episodes found in the temporal data series is initialized to be empty.

After steps of receiving inputs 512 and initializing data structures 514, the iterative process of scanning through the temporal data series starts with the set $C_1$ of all possible 1-node episodes, at step 516. This may be determined by first finding the set of all distinct event types occurring in the temporal data series.

Let $F_1^*$ be the collection of frequent principal episodes in $C_1$. Once $F_1^*$ is obtained, the collection $C_2$ of candidate 2-node episodes is generated from it. This incremental process of first obtaining $F_k^*$ from the candidates in $C_k$ and then generating $C_{k+1}$ from $F_k^*$ is repeated till the set of new candidates generated is empty. Generation of frequent principal episodes $F_k^*$ from candidates $C_k$ is explained below in connection with FIGS. 6-12, while generation of candidates $C_{k+1}$ from $F_k^*$ is explained below in connection with FIGS. 13-16.

In order to describe episodes with event durations, for each episode $\alpha$, $\alpha.g[i]$ denotes the event type associated with its $i^{th}$ node and $\alpha.d[i]$ denotes the set of time intervals associated with its $i^{th}$ node. The waits list, which links together all automata that accept a particular event, is indexed by an ordered pair (E,$\delta$) where E is an event type (i.e., element of E) and $\delta$ is an allowed duration (i.e., element of B). The set waits(E,$\delta$) stores ($\alpha$, i) pairs, indicating that an automaton for episode $\alpha$ is waiting in its $i^{th}$ state for the event type E to occur with a duration in the $\delta$ time interval so that it can make a transition to the next node of the episode.

The temporal data sequence includes a start and end time for each event in the sequence. An event is regarded as completed (and hence is ready for consideration as input to the automata) after its end time, so the iteration loop may be indexed by $\tau$, i.e. the event end time.

Figure 6:
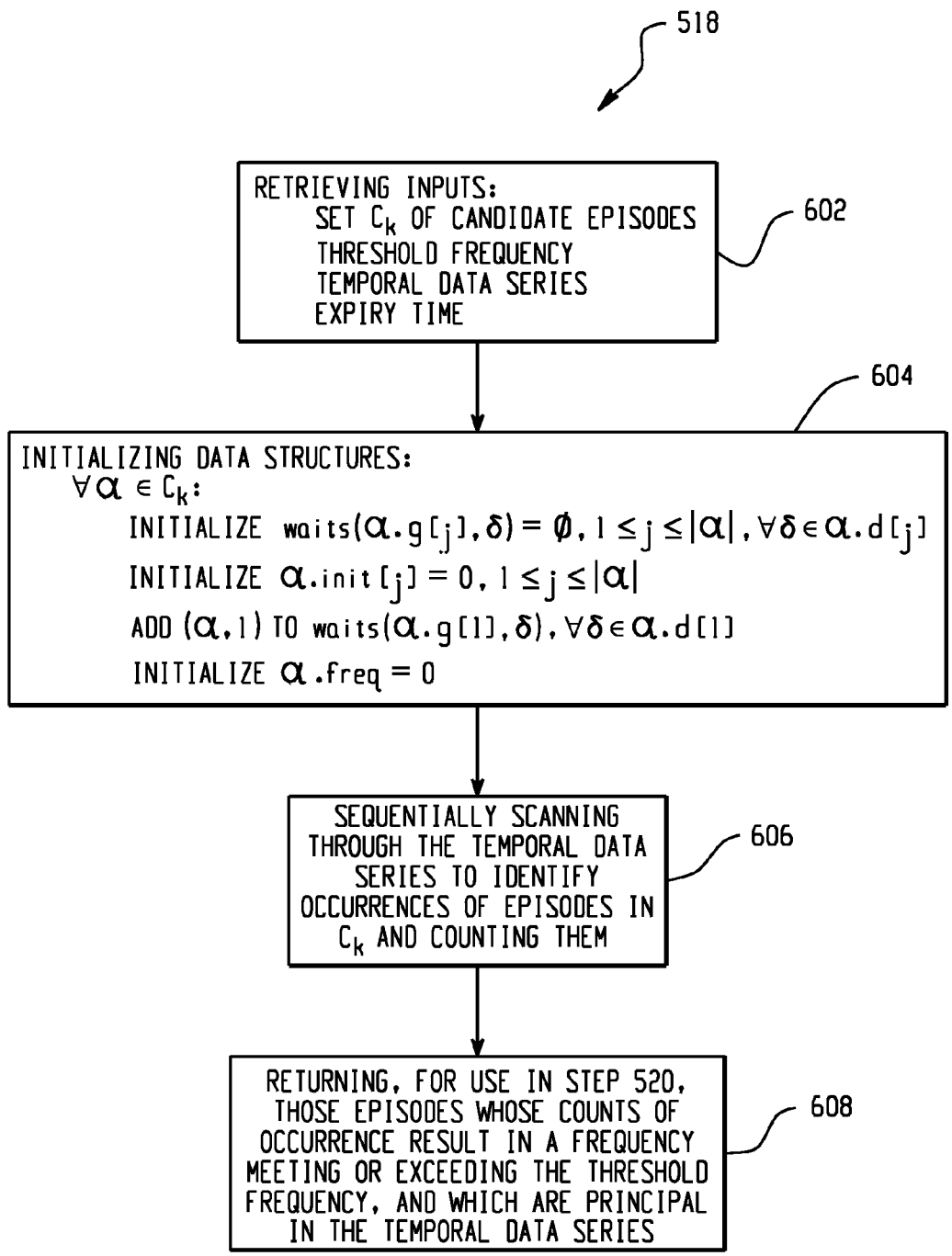
FIG. 6 depicts a flowchart depicting a method for detection of frequent episodes in temporal data series.

Now turning to FIG. 6, step 518 of FIG. 5 may include a step of retrieving inputs 602. These inputs may include, but are not be limited to, a temporal data series s including events with associated time values, a set $C_k$ of candidate episodes to be sought in the temporal data series, a threshold value $\lambda$ for occurrence frequency of an episode in the temporal data series, and an expiry time $t_x$.

In step 518, as will be discussed below, the temporal data series is traversed one event at a time. In an embodiment of step 518 as described herein, a single pass of sequentially scanning through the temporal data series may suffice. While this detailed discussion presents certain opportunities to attain the results described herein, other steps in place of those described are possible, without exceeding the scope of this disclosure.

Additional data structures of use in implementing the method are initialized in a step 604. In this way a set of automata may be generated and initialized to provide for tracking whether a candidate episode occurs in the temporal data series. In addition, for each candidate episode, a count of occurrences may be initialized to zero.

To handle cases in which an event type occurs in consecutive positions in a candidate episode, a variable bag may be initialized to be empty of contents. The variable bag may be a list, an array of pointers, or other appropriate data structure. During practice of an embodiment of the method, the variable bag may hold elements denoted herein by $(\alpha, j)$, denoting an automaton of the episode $\alpha$ is waiting for a particular event type as its $j^{th}$ event.

There may be many candidate episodes and for each candidate episode there may be multiple occurrences. Thus, at any time there may be many automata waiting for many event types to occur. In order to traverse and access the automata efficiently, for each event type E in the set $C_k$ the automata that accept E are linked together in the list waits(E,$\delta$).

The variable waits(E,$\delta$) is preferably a list, but any other appropriate data structure may be employed. Like the variable bag, the waits(E,$\delta$) list may contain entries of the form $(\alpha, j)$. In the case of waits(E,$\delta$), an entry $(\alpha, j)$ means that an automaton of the episode $\alpha$ is waiting for event type E as its $j^{th}$ event. That is, if the event type E occurs now in the event sequence, this automaton would accept it and transit to the jth state. At any time (including at the start of the counting process) there may be automata waiting for the event types corresponding to first nodes of all the candidate episodes. Accordingly, the waits(·) list is initialized as described below.

Further initialization takes place in step 604 by initializing a plurality of automata adapted to detect whether an episode of the set $C_k$ occurs in the temporal data series. Each episode $\alpha$ of $C_k$ may have $|\alpha|$ automata initialized, one for each node of the episode. The initialization of the automata includes adding an entry $(\alpha, j)$ to waits($\alpha[1]$, $\delta$), setting the episode count, $\alpha$.freq, to zero, and setting the initialization time $\alpha$.init [j], to zero for each $\alpha$-automaton. The initialization time is the time at which the first event of the episode occurred, for each instance of the automaton (for a given episode).

Further, it may be useful to prescribe an expiry time for episode occurrences, so that very widely spread out events would not be counted as an occurrence of some episode. This condition may be enforced in the method by testing the time taken to reach the new state before permitting a transition into it. This expiry time condition is an added facility in the method and the condition can easily be dropped. It may be noted that the scheme of retaining only the latest initialization time for the automata in a given state is consistent with this expiry time restriction. The expiry time may be provided as an additional input as shown in step 602 above.

Identifying occurrences of candidate episodes in the temporal data sequence is accomplished by sequentially searching through the data series with the plurality of automata at 606. This step is discussed in further detail below in connection with FIGS. 7 through 11. In brief, the automata occupy states corresponding to nodes of candidate episodes to track partial occurrences of the candidate episodes, with an automaton entering a final state when an entire occurrence of a candidate episode is detected in the temporal data series by that automaton. When a complete occurrence of a candidate episode has been tracked by an automaton, incrementing of an episode count for that candidate episode takes place. An automaton waiting for an event type makes a transition when that event type occurs, and the waits(·) list is accordingly updated. Multiple automata in the same state would be redundant, as they would only make the same transitions.

In an embodiment disclosed herein for counting non-overlapping occurrences, as described below, an automaton that reaches a common state most recently is retained, with other automata reaching the same state being discarded. A variable $\alpha$.init[j] may be used to store $|\alpha|$ initialization times for automata for the episode $\alpha$. The variable $\alpha$.init[j] indicates when an automaton for the episode $\alpha$ that is currently in its $j^{th}$ state, becomes initialized, as previously discussed. If multiple instances transit to the same state j, only the most recent initialization time is stored. When a complete occurrence of an episode is identified by an automaton for that episode, all other automata that might have been initialized for that episode are reset, in this embodiment for counting non-overlapping occurrences. Accordingly, a collection of overlapping occurrences increments the frequency for the episode by exactly one.

In an embodiment disclosed herein for counting non-interleaved occurrences, as described below, all automaton that reach a common state may be retained, in general. The exception to this is when the state corresponds to the final event of a candidate episode. An automaton reaching that state is reset and the occurrence count for the episode is reset. As is done for counting non-overlapping occurrences, the variable $\alpha$.init [j] may be used to store $|\alpha|$ initialization times for automata for the episode $\alpha$, with the variable $\alpha$.init[j] indicating when an automaton for the episode $\alpha$ that is currently in its $j^{th}$ state, becomes initialized. For non-interleaved occurrences, if multiple instances transit to the same state j, multiple initialization times are stored. Also, when a complete occurrence of an episode is identified by an automaton for that episode, other automata that might have been initialized for that episode are retained, in general.

The step of producing results is shown in step 608. These results, including a determination of frequent principal episodes found in step 606, are for use in step 520 of FIG. 5. Further detail of step 608 is provided in FIG. 12, discussed below.

In brief summary, referring to FIG. 6, there it is shown that step 602 performs retrieving of input (e.g., the fault data 112 of FIG. 1), that step 604 performs initialization of data structures used in an embodiment, and that step 606 performs sequential scanning through the temporal data series so that the results may be produced for episodes identified as frequent as shown in step 608.

Continuing with description of FIG. 6, the step of producing an output for candidate episodes whose count of occurrences yields a frequency of occurrence meeting or exceeding the threshold frequency $\lambda$ provided in step 602, shown at 608, as mentioned above.

Figure 7:
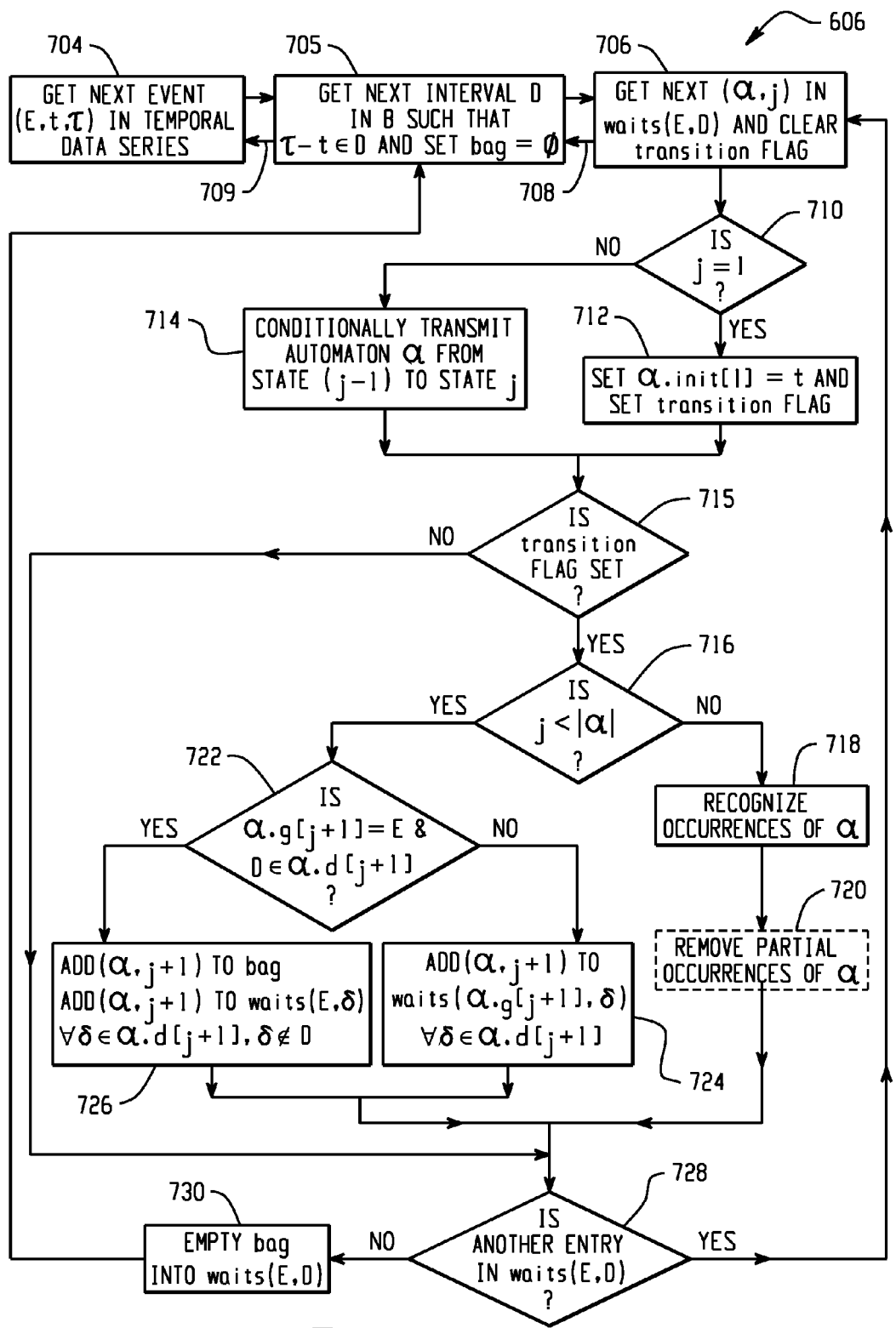
FIG. 7 depicts further detail of the method of FIG. 6 according to exemplary embodiments.

While FIG. 6 sets forth the details of step 518 in general terms, FIGS. 7-12 provide more detail of the steps in FIG. 6. For example, a more detailed depiction of step 606, identification of episodes occurring in the temporal data series, is shown in FIG. 7. In FIG. 7, at a step 704, the method retrieves the next element (E, t, $\tau$) in the temporal data series. The interval $\tau$–t is then used in a step 705 to get the next element D of B containing that interval. In step 705 also, the variable bag is set to be empty of contents. The event E is then used in retrieval of waits(E, D), which is used in step 706. waits(E, D) contains an entry for each automaton awaiting an occurrence of an event of type E in the temporal data series. In the course of execution of the method, each entry in waits(E, D) is retrieved in turn, beginning with the first one. Retrieval of the entry is identified as step 706, where for the purpose of further discussion, the retrieved entry is identified as ($\alpha$,j). A variable transition may be cleared, e.g., by setting its value to zero, in preparation for its use later in the method for indicating a state transition has occurred. When all elements of waits(E, D) have been retrieved, the method may branch at 708 to step 705 to retrieve the next element D of B containing the interval $\tau$–t. In the same way, when all elements D of B have been retrieved, the method may branch at 709 to step 704 to retrieve the next element (E, t, $\tau$) in the temporal data series.

With ($\alpha$,j), the method proceeds to a query 710 as to whether the state index j is 1 or not. If j=1, the method executes a step 712 in which the initialization time of the automaton for the episode is set to t. Also in step 712, the flag transition is set to indicate a state transition has occurred. If j is not 1, the method conditionally transits automaton $\alpha$ from state (j–1) (in which it was awaiting an event $\alpha$.g[j], that is, E) to a state j (in which it awaits an event $\alpha$.g[j+1]) at 714. Step 714, and the condition for a state transition in step 714, will be discussed more fully in connection with FIGS. 8 and 9.

If a state transition has taken place in step 712 or step 714 so that the transition flag is set 715, a query 716 is made as to whether the state index j is less than the number of nodes in the episode or not (if not, then j equals the number of nodes in the episode, by the logic disclosed herein). If j=|$\alpha$|, then an occurrence of episode $\alpha$ is recognized 718. Step 718 is discussed more fully below in connection with FIG. 10.

In an embodiment adapted to count non-overlapping occurrences of candidate episodes, a step 720 is executed in which automata in states corresponding to partial occurrences of the episode $\alpha$ are removed. Step 720 is discussed more fully below in connection with FIG. 11. In an embodiment adapted to count non-interleaved occurrences of candidate episodes, execution of step 720 is absent. Thus, in an embodiment in which non-interleaved occurrences are identified, the method does not reset all instances of an episode if one instance of it reaches the final state. This way some overlapping occurrences of a candidate episode may be counted, so long as a previous instance has transited at least one state more than the next instance.

Returning to discussion of step 716, if j<|$\alpha$|, then a further query 722 is made as to whether the next event of episode $\alpha$ might also be an event of type E. If not, then as entry ($\alpha$, j+1) is added to waits($\alpha$.g[j+1], $\delta$), $\forall \delta$ is $\alpha$.d[j+1] (which is a distinct waits($\cdot$) list, since either $\alpha$.g[j+1]$\neq$E or D is not in $\alpha$.d[j+1]).

If, on the contrary, the next event of episode $\alpha$ is again an event of type E, that is, $\alpha$.g[j+1]=E, then an entry ($\alpha$,j+1) is added to the variable bag. Since the method retrieves entries in waits(E, D) in turn (at step 706), and sets the initialization time (at step 712), sequestering the entry ($\alpha$,j+1) in bag instead of simply adding it to waits($\alpha$.g[j+1], D), which would be waits(E, D) in this case, precludes incorrectly overwriting the initialization time for the episode. In step 726 an entry ($\alpha$,j+1) is added as well to the variable waits(E, $\delta$) for all $\delta$ in $\alpha$.d[j+1] but not in D.

Following 718 (for an embodiment counting non-interleaved occurrences), step 720 (for an embodiment counting non-overlapping occurrences), step 724, or step 726, the system at 728 may branch to step 706 to retrieve the next entry in waits(E, D) if one is available. Returning to step 715 above, if a state transition has not taken place in step 712 or step 714, the method branches to step 728.

If a next entry is not available in waits(E, D), the method instead branches to a step 730 in which the contents of the variable bag are transferred into waits(E, D). Note that bag may be empty under some circumstances. Following that, the method returns to step 705. As discussed above, at step 706, the method retrieves the next element D of B containing the interval $\tau$–t. When all elements D of B have been retrieved, the method may branch at 709 to step 704 to retrieve the next element (E, t, $\tau$) in the temporal data series.

If the temporal data series is exhausted upon return to step 704, execution of step 606 finishes, and the method may continue with step 608 in FIG. 6.

Figure 8:
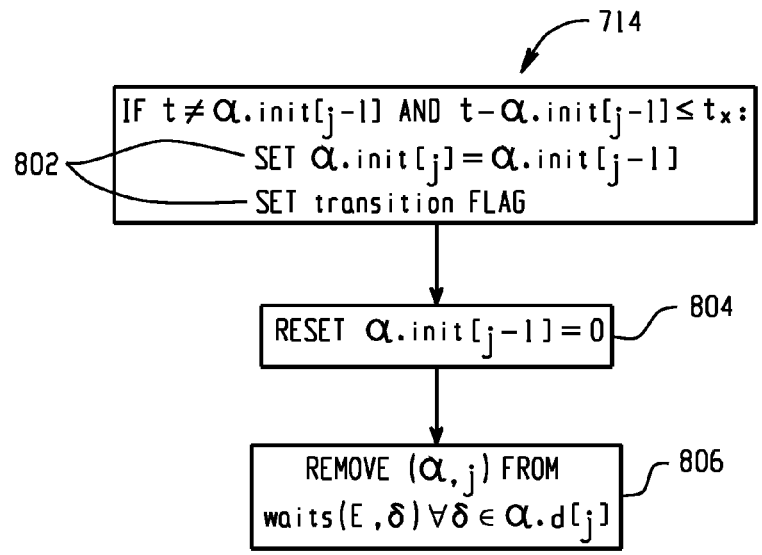
FIG. 8 depicts detail of the step of transiting an automaton shown in FIG. 7 for an embodiment in which non-overlapping occurrences of episodes are tracked.

Turning now to FIG. 8, details of step 714 are shown for an embodiment in which non-overlapping occurrences of candidate episodes are tracked and identified. Conditionally, the automaton makes a transit from state j–1 to state j. The condition is that at least some nonzero time has transpired since initialization of the automaton. In an embodiment where an expiry time is input, the condition also includes a test that less than the prescribed expiry time has transpired since the automaton was initialized. In this way the expiry time may provide a criterion for timely occurrence of an episode. The automaton makes a transition from state j–1 to state j by the following actions at a step 802: the initialization time is shifted from $\alpha$.init[j–1] to $\alpha$.init[j], and the flag transition is set. At a step 804, the variable $\alpha$.init[j–1] is reset to zero. The entry ($\alpha$,j) is removed from waits(E, $\delta$) for all $\delta$ in $\alpha$.d[j] at 806.

Steps 804 and 806 occur unconditionally, in contrast to step 802. Although step 806 is shown as following step 804, step 806 may instead occur before step 802, or between step 802 and step 804. The significant order of steps in FIG. 8 is that step 804 follow step 802, if step 802 occurs.

Figure 9:
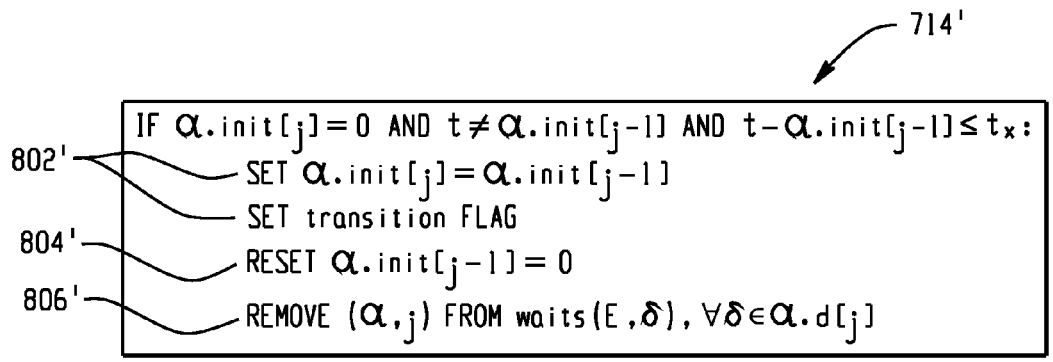
FIG. 9 depicts detail of the step of transiting an automaton shown in FIG. 7 for an embodiment in which non-interleaved occurrences of episodes are tracked.

Turning now to FIG. 9, details of a step 714' are shown for an embodiment in which non-interleaved occurrences of candidate episodes are tracked and identified. As in FIG. 8, conditionally the automaton makes a transit from state j–1 to state j. The condition now is that at least some nonzero time has transpired since initialization of the automaton, and that no automaton for that episode is already in state j. This may be determined, for example, by checking that $\alpha$.init[j] is zero. Thus in an embodiment for identifying non-interleaved occurrences, the method does not permit a transition into a particular state (except for first state) if there is already an instance of the automaton waiting in that state. In other words, while it still uses only one automaton per state, it does not forget an earlier initialization of the automaton until that has transited to the next state.

There may be many sets of non-interleaved occurrences of an episode in the event sequence. The embodiment as disclosed herein for counting non-interleaved occurrences counts that set of non-interleaved occurrences, which includes the first occurrence of the episode in the event sequence.

In an embodiment where an expiry time is input, the condition may also include a test that less than the prescribed expiry time has transpired since the automaton was initialized, as also shown in FIG. 9. In this way the expiry time may provide a criterion for timely occurrence of an episode. The automaton makes a transition from state j–1 to state j by the actions at step 802', 804', and 806'. The initialization time is shifted from $\alpha$.init[j–1] to $\alpha$.init[j], and the flag transition is set at 802'. At a step 804', the variable $\alpha$.init[j–1] is reset to zero. The entry ($\alpha$,j) is removed from waits(E,$\delta$) for all $\delta$ in $\alpha$.d[j] at 806'.

Steps 804' and 806' are conditional, along with step 802'. Although step 806' is shown as following step 804', step 806' may instead occur before step 802', or between step 802' and step 804'. The significant order of steps in FIG. 9 is that step 804' follow step 802'.

Figure 10:
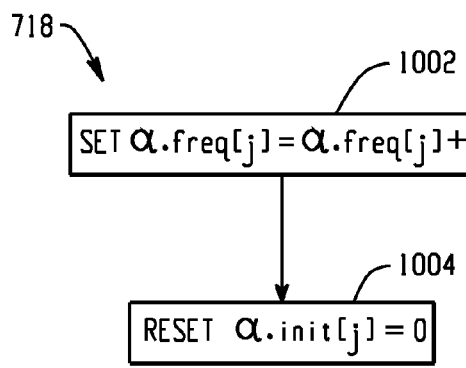
FIG. 10 depicts detail of the step of recognizing an occurrence of an episode shown in FIG. 7.

Turning now to FIG. 10, details of step 718, recognizing an occurrence of episode α, are shown. At 1002 the episode count for episode α is incremented by setting α.freq[j] =α.freq[j]+1. At step 1004, the initialization time is reset to zero, α.init[j]=0. Although shown with step 1002 preceding step 1004, the two steps may occur in the opposite order.

Figure 11:
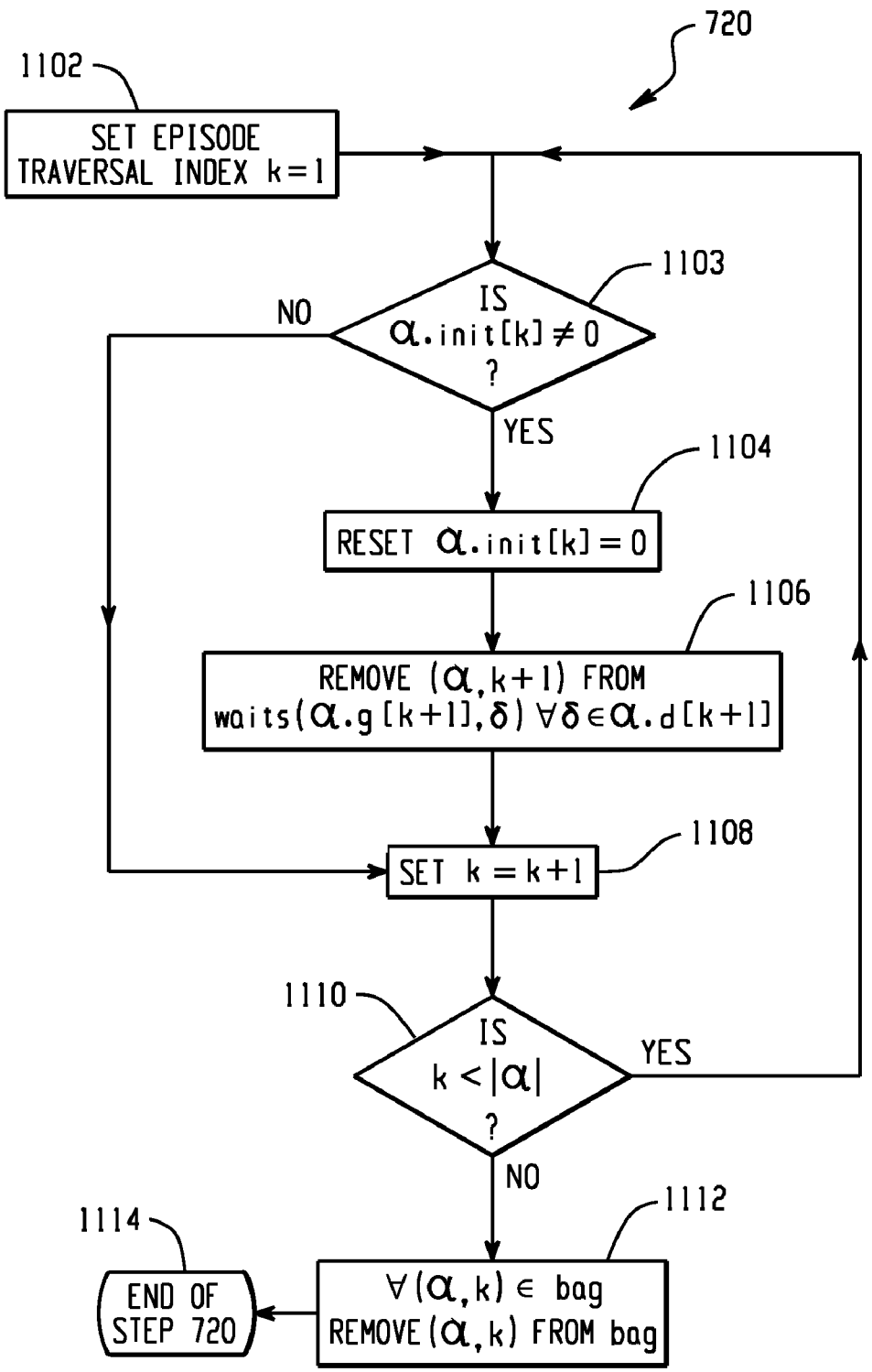
FIG. 11 depicts additional detail of the step of removing partial occurrences of an episode shown in FIG. 7.

Turning now to FIG. 11, details of the step 720 of removing automata in states corresponding to partial occurrences of the episode α are shown. First, an episode traversal index k may be initialized to a value 1 at 1102. Next, if the initialization time α.init[k] is nonzero 1103, then at a step 1104, the initialization time α.init[k] is reset to zero and at a step 1106, the entry (α,k+1) is removed from waits(α.g[k+1], δ), for all δ in α.d[k+1]. Note that steps 1104 and 1106, if they occur, may occur in any order, although FIG. 11 depicts step 1104 occurring first. Next, the episode traversal index k is incremented, k=k+1 at 1108. At 1110 a query is made as to whether k<|α|. If so, a branch to step 1103 is made, and execution continues therefrom. Otherwise, at a step 1112, if the variable bag contains an entry (α,k), the entry (α,k) is removed from bag. Following step 1112, step 720 ends at 1114.

In brief summary now, discussion of FIGS. 7-11 completes discussion of details of step 606 of FIG. 6. Two embodiments of the method were discussed, one for identification of non-overlapping episodes, and one for identification of non-interleaved episodes.

Figure 12:
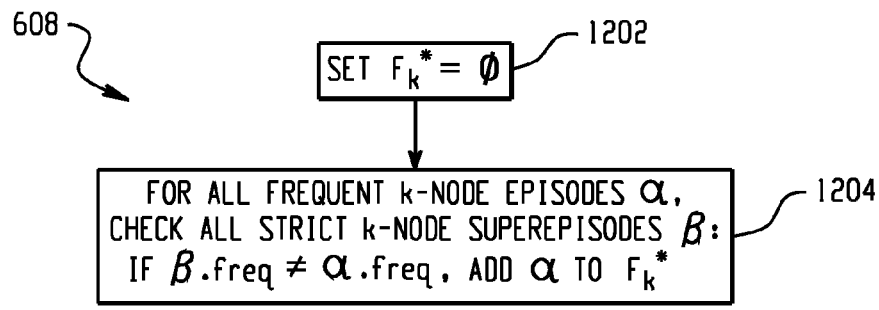
FIG. 12 depicts additional detail of the step of FIG. 6 of determining if a frequent episode is principal.

Turning now to further discussion of step 608 of FIG. 6, FIG. 12 depicts a first step 1202 of initializing the variable $F_k^*$ to be empty. As described above in connection with step 518 of FIG. 5, $F_k^*$ is intended to hold frequent principal episodes of length k. At a step 1204, each frequent k-node episode α is checked to see whether it is principal in the temporal data series. If α is found to be principal, $F_k^*$ is updated to contain α.

The check for whether α may be principal is made by finding all strict k-node superepisodes β of α that occur in the temporal data series. If no β≻α is similar in s to α, then α is principal in s. Because the test is restricted to strict k-node superepisodes β that occur in the temporal data series, the test for similarity involves solely a test that the frequencies of occurrence of α and β are identical. If the frequencies differ, then α is principal in s and added to $F_k^*$.

Figure 13:
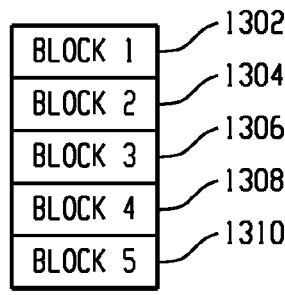
FIG. 13 depicts an arrangement of blocks in the data structure $F_k^*$ of frequent principal episodes of length k.

One arrangement of episodes in $F_k^*$ is shown in FIG. 13. FIG. 13 displays a set of blocks 1302, 1304, 1306, 1308, and 1310. The actual number of blocks to be used depends on details of the episodes in $F_k^*$.

Episodes in $F_k^*$ are sorted in some order. One possible order is lexicographic order. This may be appropriate when event types are considered as symbols and the symbols can be ordered as if listed in a dictionary. Any specific order will suffice, provided where an event is to be positioned in a set of events subject to the order is unambiguous. This definition of order may also include ordering an event according to its allowed duration information, i.e., its interval set.

The k-node frequent principal episodes may thus be arranged as a lexicographically sorted collection $F_k^*$ of k-length arrays. The $i^{th}$ episode in the collection has two components for its specification—the first is $F_k^*[i].g[j]$ which refers to the event type association for $j^{th}$ node, and the second is $F_k^*[i].d[j]$ which stores the collection of intervals (which specify the dwelling times allowed) associated with the $j^{th}$ node. $F_k^*[i].d[j]$ is a list of intervals and the $k^{th}$ element of this list is denoted by $F_k^*[i].d[j][k]$. The episode collection is viewed as constituted in blocks such that within each block in $F_k^*$ the first (k−1) nodes are identical, i.e., both the event type as well as the timing information of the first (k−1) nodes are the same for the episodes in a block. Potential (k+1)-node candidates are constructed by combining two episodes within a block as will be discussed below. The newly constructed (k+1)-node episode is declared a candidate only if every subepisode generated by dropping one of its nodes is already known to be principal and frequent (and hence is in $F_k^*$).

Figure 14:
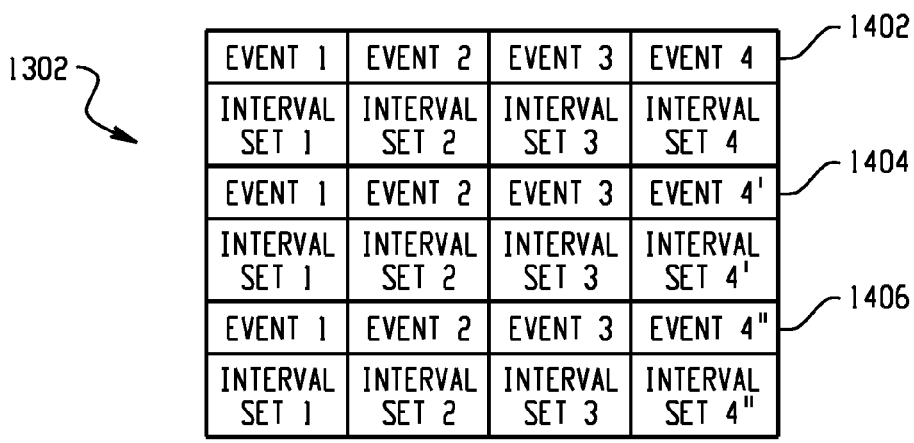
FIG. 14 depicts an ordering of frequent principal episodes within a block of $F_k^*$.

When the episodes are ordered, $F_k^*$ typically has the structure shown in FIG. 13. Each block, e.g., 1302, will include those episodes whose first k−1 events will be identical, both as to event type and interval set. This is shown in FIG. 14. In the example of FIG. 14, k=4. In FIG. 14, three episodes 1402, 1404, and 1406 are shown as an example, each with four entries. Each of the three episodes has the same event type and interval set for a fist entry, namely event 1 and interval set 1 in FIG. 14. For all three episodes 1402, 1404, and 1406, the second entry is event 2 and interval set 2, as shown. This pattern continues within a block until the last entry of the episodes. In FIG. 14, for example, episode 1402 has a last entry event 4 and interval set 4, while episode 1404 has a last entry event 4' and interval set 4'. Episode 1406 has a last entry event 4" and interval set 4".

Adopting episode ordering as the structuring principle for $F_k^*$ has a benefit that when a new principal episode α is determined, it readily may be inserted into $F_k^*$ in the appropriate block.

Figures 15, 16:
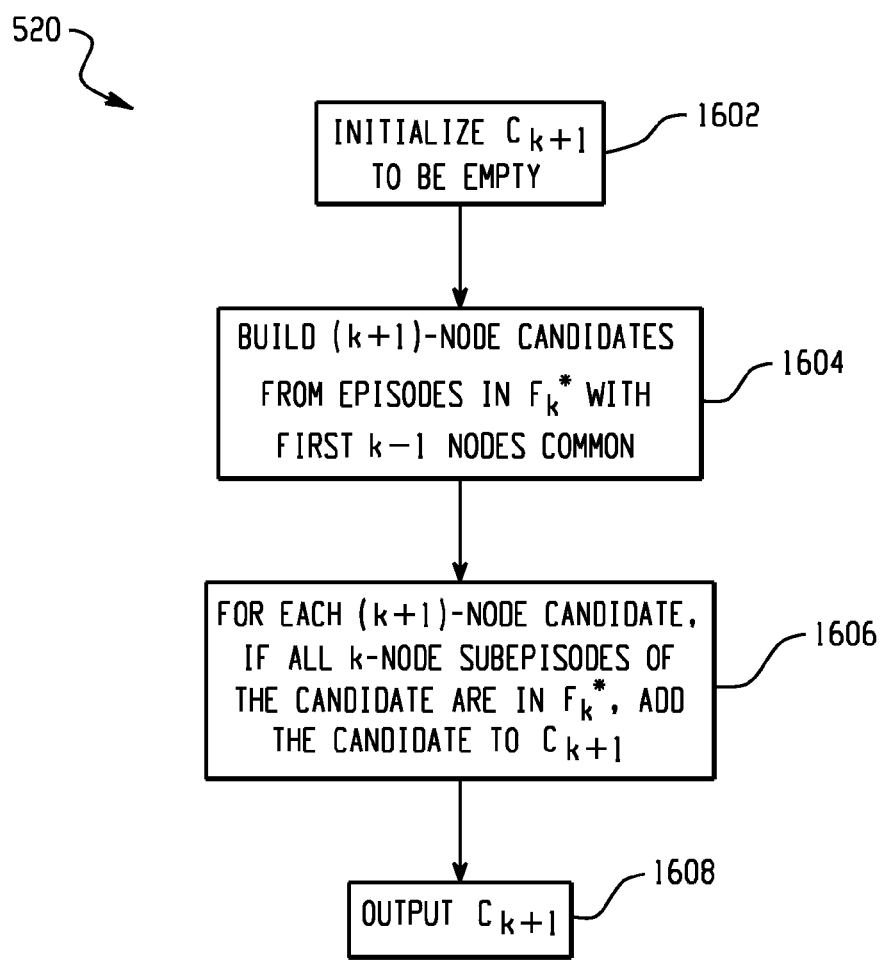
FIG. 15 depicts example candidate blocks of length k+1 generated from frequent principal episodes shown in FIG. 14.
FIG. 16 depicts additional detail of the step of generating candidate episodes of length k+1 from frequent principal episodes of length k.

The block structure of $F_k^*$ also facilitates generation of new candidate episodes from frequent principal episodes. FIG. 15 depicts example new candidate episodes 1502 and 1504 generated from episodes 1402, 1404, and 1406 of FIG. 14.

Candidate episodes 1502 and 1504 have their first k−1 entries in common. In the example shown, they have their first three entries in common. For their last two entries, one each is drawn from the last entry of 1402, 1404, or 1406. As shown, candidate episode 1502 includes the last entries of episode 1402 and 1406, and candidate episode 1504 includes the last entries of 1406 and 1404.

FIG. 16 depicts details of step 520 of FIG. 5. In FIG. 512, the candidate generation is done through the steps shown. First, at 1602, the collection $C_{k+1}$ of candidate episodes of length k+1 is initialized to be empty. At 1604, (k+1)-node candidate episodes are built from frequent principal episodes of length k, as discussed above. A newly constructed (k+1)-node episode is declared a candidate only if every subepisode generated by dropping one of its nodes is already known to be principal and frequent (and hence is in $F_k^*$).

Thus, at step 1606, for each (k+1)-node candidate episode, k+1 k-node subepisodes are constructed by omitting one of the nodes of the (k+1)-node candidate episode. If each of these k+1 k-node subepisodes are in $F_k^*$, the (k+1)-node candidate episode is added to $C_{k+1}$. At step 1608, the collection $C_{k+1}$ is returned as a result or output, and method 500 continues with step 522.

Returning now to step 530 of FIG. 5, the rule discovery process in the generalized framework of discovery of frequent episodes with dwelling times can be described in the following form. As above, $F_s^*$ denotes the set of all frequent principal episodes in s. The rules take the form $β^* \to α^*$, where $β^* \prec α^*$ and $α^*$, $β^* \in F_s^*$. To obtain such rules all the frequent principal episodes in the event sequence s are first computed (see step 526). For each such frequent episode-subepisode pair, $α^*$, $β^* \in F_s^*$, with $β^* \prec α^*$, the subepisode is said to imply the episode if the ratio of their frequencies of occurrence in the event sequence exceeds a confidence threshold $ρ_{min}$.

Figure 17:
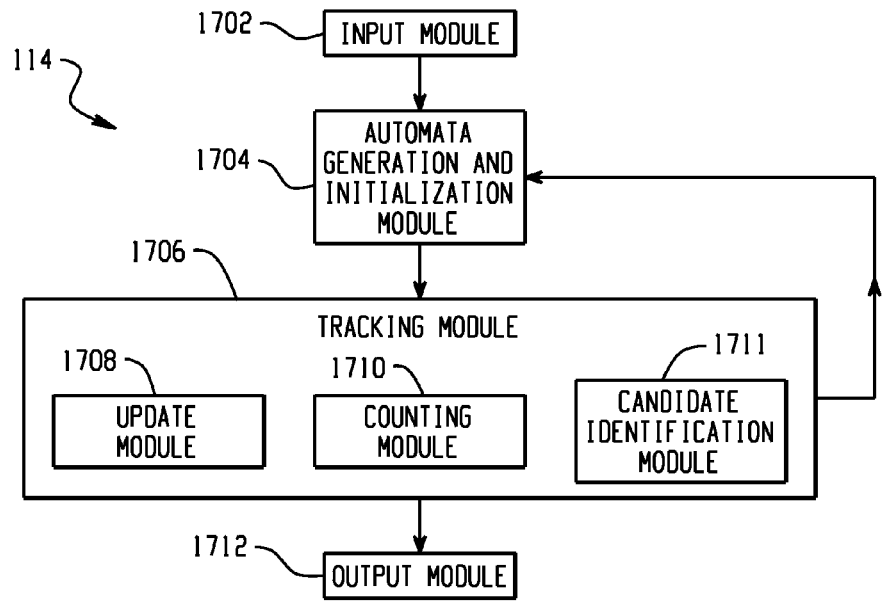
FIG. 17 depicts an exemplary modular structure of a temporal data mining (TDM) diagnostics tool.

FIG. 17 depicts a modular structure of the TDM diagnostics tool 114 of FIG. 1 in accordance with an exemplary embodiment. In FIG. 17, an input module 1702 provides for accepting input of a temporal data series. The temporal data series may be retrieved by input module 1702 from, e.g., the fault data 112 of FIG. 1. Input module 1702 in addition provides for accepting input of a set B of allowed dwelling times, and for accepting input of a threshold frequency and confidence threshold as well as an expiry time.

The TDM diagnostics tool 114 may also include an automata generation and initialization module 1704 to provide a sufficient number of automata, properly initialized, for tracking occurrences of candidate episodes in the temporal data series. As discussed previously, in general, as many as $|\alpha|$ automata for a particular episode $\alpha$ may be used to track all partial occurrences of the episode $\alpha$.

A tracking module 1706 manages, in an update module 1708, the automata tracking events of the data series through the transitions they make, and counts detected occurrences of candidate episodes in counting module 1710. Candidate identification module 1711 provides for detection of the occurrences. Tracking module 1706 may branch back to module 1704 for continued generation and/or initialization of automata.

An output module 1712 provides for output for candidate episodes whose frequency of occurrence in the data series meets of exceeds the threshold frequency provided to input module 1702. The output module 1712 may also generate the reports 116 of FIG. 1.

Figure 18:
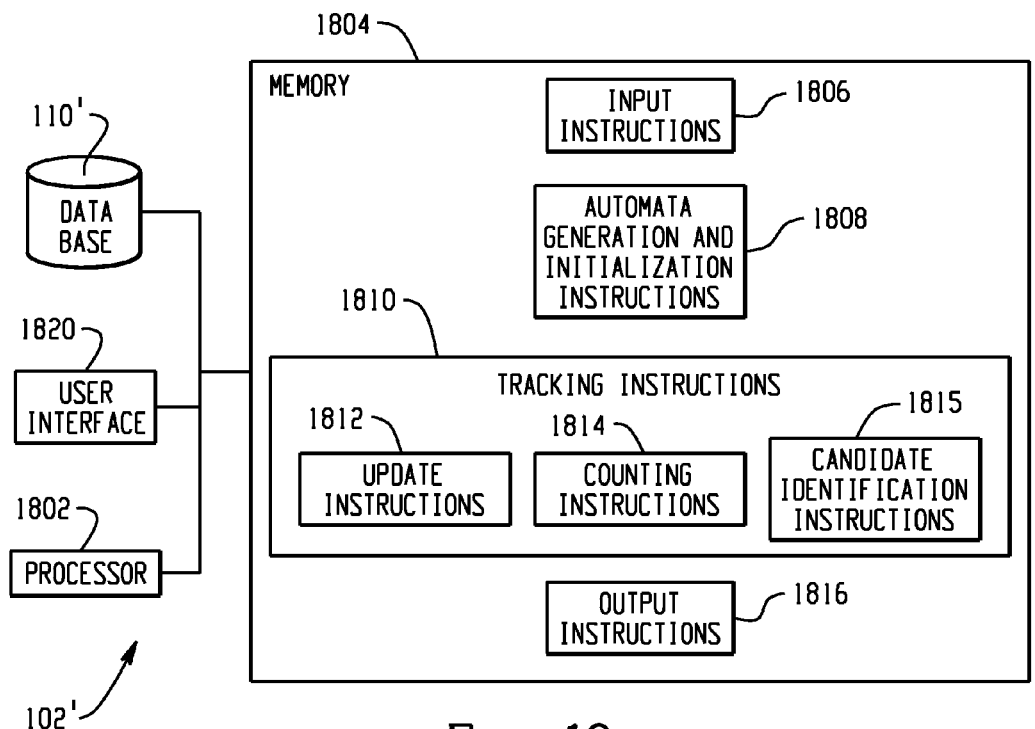
FIG. 18 depicts an alternate exemplary host system in accordance with exemplary embodiments.

FIG. 18 depicts an alternate exemplary embodiment of a host system 102' for performing fault data correlation and root cause diagnostic analysis. In FIG. 18, a processor 1802 processes instructions stored in memory 1804 as input instructions 1806, automata generation and initialization instructions 1808, tracking instructions 1810, update instructions 1812, counting instructions 1814, candidate identification instructions 1815, and output instructions 1816. Processor 1802 executes the instructions to process temporal data retrieved from database 110' in accordance with input provided through user interface 1820. The database 110' represents an alternate exemplary embodiment of the data storage device 110 of FIG. 1, and may include fault data as temporal data within the database 110'. Outputs, such as reports, may be sent to the user interface 1820 and/or the database 110'.

In summary, the temporal data mining technology as described herein can search for patterns of interest in time series fault data in support of root cause diagnostic analysis. As described in detail above, the TDM diagnostics tool 114 of FIGS. 1 and 17 may perform a method of temporal data mining for fault data correlation. The method may include receiving as input a series of temporal (i.e., time-stamped) data, a set of candidate episodes to be sought in the data series, and a threshold frequency of occurrence for the candidate episodes. The method also includes a step of generating automata adapted to track whether a candidate episode occurs in the temporal data series, and then tracking, with the automata, whether the episode occurs in the temporal data series. The method includes a further step of incrementing a count when an occurrence of the episode has been tracked by the automaton and a step of producing an output for candidate episodes whose count of occurrences results in a frequency exceeding the threshold frequency. A correlation confidence of faults within episodes may be calculated and output as part of the reporting process to assist in determining the root cause of the faults.

Technical effects of exemplary embodiments include applying temporal data mining for fault data correlation in a diagnostic system. The fault data correlation may support root cause diagnostics of machine and/or system faults. Further technical effects may include reporting fault episode frequency and confidence levels of correlation between faults. Advantages include elimination of misleading troubleshooting theories through reporting the existence of correlations between faults, as well as the absence of correlations between faults. Further technical effects may include identifying the root cause of an episode of faults and calculating the associated downtime for the episode. Reporting the downtime for an episode can be advantageous, particularly for well-known and expected episodes, as this information can be used to improve planning and reaction strategies for common episodes.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for fault data correlation in a diagnostic system, comprising:

receiving the fault data including a plurality of faults collected over a period of time;

identifying a plurality of episodes within the fault data, wherein each episode includes a sequence of the faults;

calculating a frequency of the episodes within the fault data;

categorizing each of the episodes as an episode type, wherein the episode type is one of a well-known episode, an expected episode, and an unexpected episode;

calculating a correlation confidence of the faults relative to the episodes as a function of the frequency of the episodes;

outputting a report of the faults with the correlation confidence; and filtering the report as a function of the episode type.

2. The method of claim 1 wherein the fault data includes a temporal data series comprising events with start times and end times, a set of allowed dwelling times, and a threshold frequency.

3. The method of claim 2 further comprising:
finding all frequent principal episodes of a particular length in the temporal data series having dwelling times, as determined by the start and end times, within the allowed dwelling times;
in successive passes through the temporal data series:
incrementing the particular length to generate an increased length;
combining frequent principal episodes to create combined episodes of the increased length;
creating a set of candidate episodes from the combined episodes by removing combined episodes which have non-frequent sub-episodes;
identifying one or more occurrences of a candidate episode in the temporal data series;
incrementing a count for each identified occurrence;
determining frequent principal episodes of the increased length; and
setting the particular length to the increased length; and
producing an output for frequent principal episodes;
wherein a frequent principal episode is a principal episode whose count of occurrences results in a frequency meeting or exceeding the threshold frequency.

4. The method of claim 1 further comprising:
identifying an initial fault in the sequence of faults in one of the episodes as a root cause; and
reporting the root cause.

5. The method of claim 1 further comprising:
calculating downtime as time duration between an initial fault and a final fault in the sequence of faults in one of the episodes; and
reporting the downtime.

6. The method of claim 1 wherein the fault data is limited to a selected period of time.

7. A system for fault data correlation in a diagnostic system, the system comprising:
a host system;
a data storage device in communication with the host system, the data storage device holding fault data; and
a temporal data mining (TDM) diagnostics tool executing on the host system, the TDM diagnostics tool including computer instructions for performing:
receiving the fault data including a plurality of faults collected over a period of time;
identifying a plurality of episodes within the fault data, wherein each episode includes a sequence of the faults;
calculating a frequency of the episodes within the fault data;
categorizing each of the episodes as an episode type, wherein the episode type is one of a well-known episode, an expected episode, and an unexpected episode;
calculating a correlation confidence of the faults relative to the episodes as a function of the frequency of the episodes;
outputting a report of the faults with the correlation confidence; and
filtering the report as a function of the episode type.

8. The system of claim 7 wherein the fault data includes a temporal data series comprising events with start times and end times, a set of allowed dwelling times, and a threshold frequency.

9. The system of claim 8 wherein the TDM diagnostics tool further performs:
finding all frequent principal episodes of a particular length in the temporal data series having dwelling times, as determined by the start and end times, within the allowed dwelling times;
in successive passes through the temporal data series:
incrementing the particular length to generate an increased length;
combining frequent principal episodes to create combined episodes of the increased length;
creating a set of candidate episodes from the combined episodes by removing combined episodes which have non-frequent sub-episodes;
identifying one or more occurrences of a candidate episode in the temporal data series;
incrementing a count for each identified occurrence;
determining frequent principal episodes of the increased length; and
setting the particular length to the increased length; and
producing an output for frequent principal episodes;
wherein a frequent principal episode is a principal episode whose count of occurrences results in a frequency meeting or exceeding the threshold frequency.

10. The system of claim 7 wherein the TDM diagnostics tool further performs:
identifying an initial fault in the sequence of faults in one of the episodes as a root cause; and
reporting the root cause.

11. The system of claim 7 wherein the TDM diagnostics tool further performs:
calculating downtime as time duration between an initial fault and a final fault in the sequence of faults in one of the episodes; and
reporting the downtime.

12. The system of claim 7 wherein the fault data is limited to a selected period of time.

13. A computer program product for fault data correlation in a diagnostic system, the computer program product comprising:
a storage medium readable by a processing circuit and storing instructions for execution by the processing circuit for implementing a method, the method comprising:
receiving the fault data including a plurality of faults collected over a period of time;
identifying a plurality of episodes within the fault data, wherein each episode includes a sequence of the faults;
calculating a frequency of the episodes within the fault data;
categorizing each of the episodes as an episode type, wherein the episode type is one of a well-known episode, an expected episode, and an unexpected episode;
calculating a correlation confidence of the faults relative to the episodes as a function of the frequency of the episodes;
outputting a report of the faults with the correlation confidence; and
filtering the report as a function of the episode type.

14. The computer program product of claim 13 wherein the fault data includes a temporal data series comprising events with start times and end times, a set of allowed dwelling times, and a threshold frequency.

15. The computer program product of claim 14 further comprising:

finding all frequent principal episodes of a particular length in the temporal data series having dwelling times, as determined by the start and end times, within the allowed dwelling times;

in successive passes through the temporal data series:

incrementing the particular length to generate an increased length;

combining frequent principal episodes to create combined episodes of the increased length;

creating a set of candidate episodes from the combined episodes by removing combined episodes which have non-frequent sub-episodes;

identifying one or more occurrences of a candidate episode in the temporal data series;

incrementing a count for each identified occurrence;

determining frequent principal episodes of the increased length; and setting the particular length to the increased length; and producing an output for frequent principal episodes;

wherein a frequent principal episode is a principal episode whose count of occurrences results in a frequency meeting or exceeding the threshold frequency.

16. The computer program product of claim 13 further comprising:

identifying an initial fault in the sequence of faults in one of the episodes as a root cause; and reporting the root cause.

17. The computer program product of claim 13 further comprising:

calculating downtime as time duration between an initial fault and a final fault in the sequence of faults in one of the episodes; and reporting the downtime.

\* \* \* \* \*